(12) United States Patent
Sugimoto et al.

(10) Patent No.: US 9,698,603 B2
(45) Date of Patent: Jul. 4, 2017

(54) COMBINED POWER GENERATION SYSTEM HAVING POWER CONVERTING APPARATUS

(71) Applicant: KAWASAKI JUKOGYO KABUSHIKI KAISHA, Kobe-shi, Hyogo (JP)

(72) Inventors: Kazushige Sugimoto, Amagasaki (JP); Masahide Kawamura, Kobe (JP); Kentaro Sakata, Akashi (JP); Mitsuchika Ogawa, Kobe (JP); Kentaro Tsuda, Kobe (JP); Takefumi Iizaka, Kobe (JP); Yuko Hirase, Kobe (JP)

(73) Assignee: KAWASAKI JUKOGYO KABUSHIKI KAISHA, Kobe-Shi, Hyogo (JP)

( * ) Notice: Subject to any disclaimer, the term of this patent is extended or adjusted under 35 U.S.C. 154(b) by 245 days.

(21) Appl. No.: 14/758,333

(22) PCT Filed: Dec. 5, 2013

(86) PCT No.: PCT/JP2013/007163
§ 371 (c)(1),
(2) Date: Jun. 29, 2015

(87) PCT Pub. No.: WO2014/103192
PCT Pub. Date: Jul. 3, 2014

(65) Prior Publication Data
US 2015/0357820 A1    Dec. 10, 2015

(30) Foreign Application Priority Data

Dec. 27, 2012 (JP) ................................ 2012-285002

(51) Int. Cl.
*B63J 3/00* (2006.01)
*H01M 10/48* (2006.01)
(Continued)

(52) U.S. Cl.
CPC ......... *H02J 3/381* (2013.01); *H01M 8/04544* (2013.01); *H01M 8/04925* (2013.01);
(Continued)

(58) Field of Classification Search
CPC .... H02J 3/381; H02J 3/38; H02J 3/383; H02J 3/386; H02J 3/46; B63J 3/00;
(Continued)

(56) References Cited

U.S. PATENT DOCUMENTS

| 5,798,633 A * | 8/1998 | Larsen | H02J 3/28 307/87 |
| 2003/0052640 A1 * | 3/2003 | Iwaji | H02P 6/34 318/700 |

(Continued)

FOREIGN PATENT DOCUMENTS

| JP | 2007-020361 A | 1/2007 |
| JP | 2007-129845 A | 5/2007 |

(Continued)

OTHER PUBLICATIONS

Jan. 14, 2014 International Search Report issued in International Application No. PCT/JP2013/007163.
(Continued)

*Primary Examiner* — Brandon S Cole
(74) *Attorney, Agent, or Firm* — Oliff PLC

(57) ABSTRACT

A first internal phase difference angle calculator for integrating a deviation between a first frequency command value and a frequency obtained by frequency obtaining device to calculate a first internal phase difference angle, a first internal electromotive voltage command value calcula-
(Continued)

tor for proportioning and calculating a deviation between a first reactive power command value and a reactive power obtained based on the value measured by first measuring device, and adding a reference voltage to the deviation so as to calculate a first internal electromotive voltage command value, and a first current command value calculator for calculating a command value of an output current from a first power converter based on the first internal phase difference angle, the first internal electromotive voltage command value, and a voltage measured by the voltage measuring device. The apparatus controls the first power converter based on an output from the first current command value calculator.

13 Claims, 17 Drawing Sheets

(51) Int. Cl.
    *H02M 7/04*     (2006.01)
    *H02J 3/38*     (2006.01)
    *H02M 7/44*     (2006.01)
    *H01M 10/44*     (2006.01)
    *H02J 3/46*     (2006.01)
    *H02M 7/539*     (2006.01)
    *H01M 8/04858*     (2016.01)
    *H01M 16/00*     (2006.01)
    *H01M 8/04537*     (2016.01)

(52) U.S. Cl.
    CPC .......... *H01M 10/44* (2013.01); *H01M 10/48* (2013.01); *H01M 16/006* (2013.01); *H02J 3/38* (2013.01); *H02J 3/383* (2013.01); *H02J 3/386* (2013.01); *H02J 3/46* (2013.01); *H02M 7/04* (2013.01); *H02M 7/44* (2013.01); *H02M 7/539* (2013.01); *H02J 3/387* (2013.01); *H02J 2003/388* (2013.01); *Y02E 10/563* (2013.01); *Y02E 10/763* (2013.01); *Y02T 90/38* (2013.01); *Y10T 307/549* (2015.04)

(58) Field of Classification Search
    CPC ......... H01M 8/04544; H01M 8/04925; H01M 10/44; H01M 10/48; H01M 16/006; H02M 7/04; H02M 7/44; H02M 7/539
    USPC ...................................................... 307/32–75
    See application file for complete search history.

(56) References Cited

U.S. PATENT DOCUMENTS

| | | | |
|---|---|---|---|
| 2012/0051104 A1* | 3/2012 | Ohshima | H02J 3/14 363/84 |
| 2016/0006338 A1* | 1/2016 | Sakimoto | H02M 7/53875 363/131 |
| 2017/0033591 A1* | 2/2017 | Govindaraj | H02J 7/042 |

FOREIGN PATENT DOCUMENTS

| | | |
|---|---|---|
| JP | 2007-244068 A | 9/2007 |
| JP | 2008278700 A | 11/2008 |
| JP | 2009-225599 A | 10/2009 |
| JP | 2010-116071 A | 5/2010 |
| JP | 2012-130146 A | 7/2012 |

OTHER PUBLICATIONS

Jul. 25, 2016 Extended Search Report issued in European Patent Application No. 13868732.2.

* cited by examiner

COMBINED POWER GENERATION SYSTEM HAVING POWER CONVERTING APPARATUS

TECHNICAL FIELD

The present invention relates to a combined power generation system having a power converting apparatus that has plural types of power supplies and is provided to the power supplies.

BACKGROUND ART

Normal power systems are commercial power systems supplied by electric power companies, and maintenance of power supply quality in commercial power systems is done mainly by an electric power company.

On the other hand, in self-supported power supply systems that are not connected to commercial power systems, maintenance of power supply quality should be made by themselves. Examples of such self-supported power supply systems are power supply systems in vessels and microgrids where plural types of power supplies are combined to form a network in a constant area.

Patent Literature 1 discloses a in-vessel power supply system having a plurality of accessory power generators, a power storage apparatus for performing a charging/discharging operation, and an electric propulsion device is provided with a power detector for detecting an electric power consumed by the electric propulsion device, a starting switch for giving a starting command, and a control circuit for brings the power storage apparatus into a charging mode when a detection signal of the power detector is a threshold value or less and brings the power storage apparatus into a discharging mode according to the starting command of the starting switch so as to make accumulated electric power to be discharged to an in-vessel power bus. Further, in this constitution, when a thrust force of the electric propulsion device is reduced so that a vessel drive forward at a time of vessel entered port and its power consumption is the threshold or less, the control circuit allows the power storage apparatus to be charged from the accessory power generators. Further, Patent Literature 1 discloses that when the starting command is received from the starting switch during the charging operation, the power storage apparatus is allowed to perform the discharging operation so as to supply a discharge power to the electric propulsion device, and an accessory motor for driving the accessory power generator is efficiently operated during a time from the vessel entered port to berthing so that a fuel to be used by the accessory motor and exhaust gas are reduced.

Such an in-vessel power supply system is normally a self-supported power supply system that is independent from a commercial electric power system, and is supplied with electricity in conjunction with the commercial electric power system during berthing and anchorage.

Patent Literature 2 discloses a technique that secures stability and quality of a microgrid using a power converting apparatus provided to an electricity storage facility in the microgrid having a motor power generator, a dispersed power supply using natural energy such as photovoltaic power generation and wind power generation, and an electricity storage facility having a secondary battery.

The in-vessel power supply system and the microgrid constitute a combined power generation system composed of various power supplies such as a power storage apparatus composed of a motor power generator or a secondary battery and a power converter, a power generator using a solar battery, and a power generator using a fuel cell.

Patent Literature 3 discloses a technique relating to a power converting apparatus that is used in a power storage apparatus, and can bear a high-frequency component and an unbalanced component of a load current without additionally providing a detector of a load current. That is to say, the power converting apparatus in Patent Literature 3 includes a controller, and a power converter capable of converting a DC power of a secondary battery into an AC power, and converting the AC power input via an output line into a DC power so as to store it in the secondary battery. The controller is provided with a virtual power generating apparatus instead of the power converter and the secondary battery. The controller includes a virtual power generating apparatus model section for calculating a current value to be output based on a voltage of the output line of the power converter and determining a current command value, and a control signal generator for outputting an electric current corresponding to the current command value to the output line. Patent Literature 3 discloses a technique where in the virtual power generating apparatus model section, an engine model converts a fuel supply quantity to be calculated by a governor model into a mechanical torque of an engine without taking a response characteristic of the engine into consideration so as to calculate an angular velocity and a phase angle of the power generator.

The power converting apparatus has two kinds of apparatuses including a current control type apparatus and a voltage control type apparatus from a viewpoint of its control method. Patent Literature 4 discloses a technique of a current control type power converter. That is to say, it discloses a technique of a parallel operation apparatus constituted so as to suppress a load fluctuation of a self-supported power supply system composed of a power storage apparatus and a synchronous power generator using a DC power supply. Concretely, it discloses a technique that constitutes the parallel operation apparatus where in order to sufficiently cope with an abrupt change in a load and an unbalanced load in the parallel operation apparatus, a signal composed of a negative correction amount due to dropping characteristics of a frequency setting value and a frequency of self-supported power supply system is input into a frequency controller so that an active current setting value is obtained, and a signal composed of a deviation between a voltage setting value and a voltage effective value of the self-supported power supply system and a negative correction amount due to a dropping characteristic of a voltage is input into a voltage controller so that a reactive current setting value is obtained.

CITATION LIST

Patent Literature

PTL 1: Japanese Patent Application Laid-Open No. 2010-116071

PTL 2: Japanese Patent Application Laid-Open No. 2007-129845

PTL 3: Japanese Patent Application Laid-Open No. 2009-225599

PTL 4: Japanese Patent Application Laid-Open No. 2007-020361

SUMMARY OF INVENTION

Technical Problem

A power converting apparatus is sorted into the current control type apparatus and the voltage control type apparatus as described above. Characteristics of the respective control systems are as follows.

The current control type power converting apparatus is controlled so that a predetermined electric current is output regardless of a voltage and a frequency of a system to be connected. This is used mainly as a power converting apparatus for system interconnection. It is assumed that the voltage and the frequency are maintained by another electric power generation facility (a commercial system, a motor power generator or the like), and thus a self-sustained operation cannot be performed in a single apparatus or only current control type power converting apparatuses.

On the other hand, the voltage control type power converting apparatus is controlled so as to output an electric power of constant voltage and frequency regardless of an output current. It is used mainly as a sole power converting apparatus for the single-sustained operation. A linkage operation with a system or a parallel operation of the voltage control type power converting apparatuses cannot be used because of unstable output.

A problem in the power supply system will be described below. In a self-supported power supply system in a microgrid or a vessel, a combined power generation system is constituted by combining a plurality of electric power generation facilities having different characteristics, and it is occasionally linked with a general commercial system according to an operating condition. Examples of the power generation facility are a power generation facility using a diesel power generator or a gas turbine power generator, a natural energy power generator adopting photovoltaic power generation or wind power generation, and a power generation facility using a fuel cell or a secondary battery. The photovoltaic power generator, the fuel cell, and the secondary battery are DC power supplies, and a power converting apparatus is used for converting a direct current into an alternate current in order to make a connection to an AC power supply system.

The microgrid requires both a linkage operation with respect to a general commercial system and a single-sustained operation. Further, in the single-sustained operation, a constitution of the power generation facility occasionally changes, and the power supply system is occasionally composed of only a power generation facility using the power converting apparatus according to circumstances.

When the microgrid is linked with the general commercial system, the power converting apparatus of the microgrid is the current control type apparatus as described above.

When the microgrid is composed of only a power supply using the power converting apparatus and all the power converting apparatuses are the current control type apparatuses, the voltage and the frequency are unstable so that the operation cannot be performed. For this reason, one apparatus should be changed into a voltage control type apparatus. Since, however, a transient load fluctuation is borne by one voltage control type power converting apparatus, responsiveness of the load fluctuation is limited by a capacity of the voltage control type power converting apparatus. Further, the voltage control type power converting apparatus should be always operated, and should be a power source that can follow an output fluctuation.

When a plurality of voltage control type power converting apparatuses is operated in parallel, a load sharing ratio of each of the power converting apparatus becomes unstable. A method for avoiding this includes a method for providing dropping characteristics to outputs of the voltage control type power converting apparatuses so as to perform the load sharing stably. However, since impedances of the power converting apparatuses are low and a slight voltage difference between the power converting apparatuses destroys a balance of the outputs, only the dropping characteristics cannot ensure a stable operation.

When the microgrid which performs a single-sustained operation is linked with a commercial electric power system, the power converter which is operated by the voltage control method should be switched into a current control type method.

A motor power generator and a fuel cell power generator such as a binary power generator are considered as a power generating apparatus (system power generator) to be installed in the microgrid. A case where the microgrid or the like is separated from the general commercial system and performs the single-sustained operation is considered. Since the voltage and the frequency of the self-supported power supply system is maintained and controlled by the system power generator installed in the microgrid and the power converting apparatus is operated in the current control type method, the load fluctuation is transitionally borne entirely by the system power generator, and power supply quality of the system depends on the characteristic and capacity of the system power generator. At this time, a large capacity of the system power generator is necessary. Further, a power generator with excellent characteristics of load following should be provided to the system. However, in general, the high-capacity power generator has less responsiveness. Since a reactive region of a fuel cell is a liner form of an air-liquid interface, its characteristics of load following is inferior.

It is an object of the present invention to provide a power converting apparatus in which when a single-sustained operation is switched into a linkage operation in a combined power generation system such as a microgrid, a control system does not have to be changed. At the same time, it is also an object to realize a self-supported power supply system with excellent characteristics of load following.

Solution to Problem

In order to solve the above problem, in a power supply system including an electricity storage facility having an electricity storage device and a first power converter connected to the electricity storage device, a power generation facility having a power generating apparatus and a second power converter, connected to the power generating apparatus, for converting an electric power of the power generating apparatus into a predetermined AC power, a combined power generation system having a power converting apparatus of the present invention, provided with a voltage measuring device for measuring a voltage of the power supply system and a frequency obtaining device for obtaining a frequency of the power supply system, includes a first measuring device for measuring values for obtaining an active power and a reactive power at an output terminal of the first power converter, a first system control device for controlling the first power converter, a second measuring device for measuring values for obtaining an active power and a reactive power at an output terminal of the second power converter, and a second system control device for controlling the second power converter. The first system control device includes a first active power command value calculator for proportioning and calculating a deviation between SOC of the electricity storage device and an SOC command value of the electricity storage device so as to calculate a first active power command value, a first frequency command value calculator having a first proportioning calculator for proportioning and calculating a deviation between the first active power command value and the active power obtained based on the value measured by the first measuring device and a first adder for adding a reference frequency to an output from the first proportioning calculator so as to calculate a first frequency command value, a first internal phase difference angle calculator for integrating a deviation between the first frequency command value and a frequency obtained by the frequency obtaining device so as to calculate a first internal phase difference angle, a first internal electromotive voltage command value calculator having a second proportioning calculator for proportioning and calculating a deviation between a first reactive power command value and a reactive power obtained based on the value measured by the first measuring device, and a second adder for adding a reference voltage to an output from the second proportioning calculator so as to calculate a first internal electromotive voltage command value, and a first current command value calculator for calculating a command value of an output current from the first power converter based on the first internal phase difference angle, the first internal electromotive voltage command value and the voltage measured by the voltage measuring device. The first power converter is controlled based on an output from the first current command value calculator. The second system control device includes a second active power command value calculator for integrating a deviation between the frequency obtained by the frequency obtaining section and a frequency command value so as to calculate a second active power command value, a second frequency command value calculator having a third proportioning calculator for proportioning and calculating a deviation between the second active power command value and an active power obtained based on the value measured by the second measuring device and a third adder for adding a reference frequency to an output from the third proportioning calculator so as to calculate a second frequency command value, a second internal phase difference angle calculator for integrating a deviation between the second frequency command value and a frequency obtained by the frequency obtaining device so as to calculate a second internal phase difference angle, a second internal electromotive voltage command value calculator having a fourth proportioning calculator for proportioning and calculating a deviation between a second reactive power command value and a reactive power obtained based on the value measured by the second measuring device, and a fourth adder for adding a reference voltage to an output from the fourth proportioning calculator so as to calculate a second internal electromotive voltage command value, and a second current command value calculator for calculating a command value of an output current from the second power converter based on the second internal phase difference angle, the second internal electromotive voltage command value, and a voltage measured by the voltage measuring device. The second power converter is controlled based on an output from the second current command value calculator.

According to this constitution, the first system control device controls charging/discharging with respect to the electricity storage device through the first power converter, so that the electricity storage facility functions as a virtual power generator. That is to say, in the electricity storage facility, a command value of the output current is output to the first power converter, so that a closed-loop control system of the active power of the first power converter and the frequency of the power supply system, and a closed-loop control system of the reactive power of the first power converter and the voltage of the power supply system are formed, and their control amounts (controlled amount) are feedback-controlled. Therefore, the electricity storage facility functions as both the current control type and voltage control type systems, and is provided with a power converter whose control system does not have to be changed when the single-sustained operation is switched into the linkage operation. Furthermore, since a feedback control system of the electricity storage facility is realized not by an actual power generator but by software, its response speed is fast in principle. Therefore, in addition to the second power converter for the power generation facility, the first power converter for the electricity storage facility functioning as a virtual power generator is used, and an excessive or insufficient load power of a generation power of the power generation facility can be compensated by the electricity storage facility whose response speed is faster than the power generation facility with respect to an abrupt load fluctuation. Particularly, the control device in the first power converter and the control device in the second power converter have the same constitution, and control parameters of the respective converters are suitably adjusted according to a characteristic of the power generation facility or the electricity storage facility to be connected to each of the converters, so that the self-supported power supply system with excellent characteristics of load following can be realized.

"Combined power generation system" in the present invention means a power supply system composed of a plurality of power generation facilities and load facilities, and it may be linked with a commercial electric power system, or may be a self-supported power supply system that is not linked with a commercial electric power system.

In this constitution, "the electricity storage facility" is composed of the electricity storage device and the power converter. "The electricity storage device" is a battery or a capacitor, and can take out a DC power. For example, "the electricity storage facility" includes a primary battery, a secondary battery, and an electric double layer capacitor. Storage of electricity is called charging, and taking-out is called discharging in some cases. Further, "the power converter" is constituted by a power conversion circuit composed of a switching element and a PWM (Pulse Width Modulation) controller for controlling the switching element into an ON/OFF state. The power converting apparatus of the present invention includes a control device having various types of measuring devices such as a voltage detection equipment and the like besides the power converter.

The SOC command value and the frequency command value may be predetermined numerical values or may be a constant value to be changeable, and can be set via, for example, a man-machine system. Similarly, the reference voltage and the reference frequency may be reference setting values for a control operation, and may be changed via, for example, a man-machine system.

The PWM controller of the power converter controls the switching element into the ON/OFF state so that, for example, an output current from the power converter becomes a given current command value. The power converter is occasionally called the current control type power converter.

The first internal electromotive voltage command value calculator may be constituted so as to subtract a voltage drop caused by first total impedance that is a sum of internal impedance of the electricity storage facility and external impedance between the electricity storage facility and the power supply system from the output from the second adder and obtain the first internal electromotive voltage command value. The second internal electromotive voltage command value calculator may be constituted so as to subtract a voltage drop caused by second total impedance that is a sum of internal impedance of the fuel cell power generation facility and external impedance between the fuel cell power generation facility and the power supply system from an output from the fourth adder and obtain the second internal electromotive voltage command value.

According to this constitution, the electricity storage facility is regarded as an equivalent circuit composed of a power generator having an internal electromotive voltage and impedance, and an internal electromotive voltage generated from an internal electromotive power is obtained in this equivalent circuit so as to be an internal electromotive voltage setting value.

"The internal impedance" can be obtained according to, for example, Thevenin's theorem. The actual internal impedance is a very small value in general. "The external impedance" is composed of a reactor and interconnection resistance provided between the power converter and an electric power system.

Since a current value is measured, if total impedance is determined, the internal electromotive voltage can be obtained by back calculation based on a system voltage value.

The first current command value calculator may be constituted so as to output a current value for flowing in the first total impedance when the first total impedance is connected between a power supply having a voltage measured by the voltage measuring device and a power supply having the voltage represented by the first internal electromotive voltage command value. The second current command value calculator may be constituted so as to output a current value for flowing in the second total impedance when the second total impedance is connected between a power supply having the voltage measured by the voltage measuring device and a power supply having the voltage represented by the second internal electromotive voltage command value.

According to this constitution, the current of the power converter is controlled so that the internal impedance is estimated larger than an actual value for obtaining a value of the current flowing there and thus becomes that current value. As a result, more stable operation of the power converter can be realized.

Since the current value is obtained based on an internal electromotive voltage and a phase angle obtained by the respective calculators containing a reactive power proportion control loop and an active power proportion control loop, this seems to be current control but also has an aspect of voltage control.

The outputs from the first internal electromotive voltage command value calculator, the second internal electromotive voltage command value calculator, the first current command value calculator and the second current command value calculator may be constituted so as to be calculated by setting the internal impedance of the electricity storage facility to a larger value than an actual value.

According to this constitution, the internal impedance is set larger so that more stable operation can be expected. When the internal impedance is large, loss is large. However, the virtual impedance is made to be larger so that the control operation on the power converter can be stabilized while actual loss is being repressed. For example, normally the internal impedance is almost zero, but when a resistance component in the total impedance is 0.1 pu and a reactance component is 0.4 pu, the control operation can be fairly stabilized.

The voltage measuring device and the frequency obtaining device have a voltage detection equipment for measuring a voltage of the power supply system, and a PLL calculator for performing a phase synchronization operation on an output from the voltage detection equipment, and a voltage of the power supply system is calculated based on the output from the voltage detection equipment, and the frequency and the phase of power supply system may be calculated based on an output from the PLL calculator.

According to this constitution, an instantaneous value of a specific two-phase (for example, RS phase, ST phase) voltage is detected via a transformer connected to three-phase AC power supply system. This value is taken into, for example, a calculator, and is subject to PLL (Phase Locked Loop) calculation (phase synchronizing calculation), so that a frequency and a voltage are calculated. An instantaneous value of a specific two-phase (for example, R phase, T phase) current is detected via a current transformer connected to a three-phase AC power supply system so that an electric power is calculated. In such a manner, since delays of the measurement of the voltage and frequency are smaller than those through a normal electric power meter, the load sharing is adjusted by using the voltage and frequency, so that satisfactory responsiveness can be obtained.

The first electric power measuring device may be constituted so as to include a voltage detection equipment for measuring a voltage of the power supply system, a PLL calculator for synchronizing and calculating a phase of an output from the voltage detection equipment, and a current detection equipment for measuring an output current from the electricity storage facility, and so as to calculate the active power and the reactive power of the first electric power measuring device based on the output from the current detection equipment and the voltage calculated by the PLL calculator. The second electric power measuring device may be constituted so as to include a voltage detection equipment for measuring a voltage of the power supply system, a PLL calculator for synchronizing and calculating a phase of an output from the voltage detection equipment, and a current detection equipment for measuring an output current from the fuel cell power generation facility, and so as to calculate the active power and the reactive power of the second electric power measuring device based on the output from the current detection equipment and the voltage calculated by the PLL calculator.

According to this constitution, when the output current is positive, the electricity storage device discharges and an electric power is supplied from the power converter to the electric power system. On the other hand, when the output current is negative, the electricity storage device charges, and an electric power is supplied from the electric power system to the power converter.

This constitution may include a first time lag calculator provided between the first proportioning calculator and the first adder, a second time lag calculator provided between the second proportioning calculator and the second adder, a third time lag calculator provided between the third proportioning calculator and the third adder, and a fourth time lag calculator provided between the fourth proportioning calculator and the fourth adder.

In this constitution, the time lag calculators are calculators for processing time lags, and for example, may be of a first-order lag type. Further, the calculators may be of a moving average type and a second-order lag type. Limiters may be provided at stages before or after the time lag calculators so as to limit output values.

In this constitution, as to lengths of time lags in the time lag calculators, a delay of a response of a power generation facility connected to the power supply system may be a time constant of each of the time lag calculators.

The time lag in the first time lag calculator may be larger than the time lag in the third time lag calculator.

The power generating apparatus may be a fuel cell, and the second power converter may convert a DC power of the fuel cell into an AC power.

The power generating apparatus may be a binary power generator, and the power generation facility may include the binary power generator, an AC-DC converter for converting an AC power of the binary power generator into a DC power, and the second power converter for converting a DC power of the AC-DC converter into an AC power.

The power supply system may be a self-supported power supply system constituted by connecting a motor power generator and a power generator using natural energy.

A self-supported power generating system in the present invention means a power supply system that is independent form a commercial electric power system. In the self-supported power supply system, generally a system voltage and a frequency are not governed unlike a commercial electric power system, and thus they are determined by electric power supply and demand.

The power supply system may be a self-supported power supply system constituted by connecting a plurality of electricity storage facilities.

The power supply system may be constituted so as to be connectable to a commercial electric power system via a circuit breaker.

These and other objects, features, aspects and advantages of the present invention will become more apparent from the following detailed description of the present invention when taken in conjunction with the accompanying drawings.

Advantageous Effects of Invention

According to the present invention, in the combined power generation system such as a microgrid, switching between the system linkage operation and the single-sustained operation can be realized without changing the control method. Further, the self-supported power supply system can be operated only by the power converting apparatus. As a result, the self-supported power supply system where the electricity storage facility is combined with the power generation facility can be realized, and thus suitable power supply quality can be maintained for dealing with the load fluctuation without damaging the power generation facility.

DESCRIPTION OF EMBODIMENTS

An embodiment of the present invention will be described below with reference to the drawings. Like member in all the drawings are denoted by like reference symbols, and overlapped description thereof is omitted.

Figure 1A:
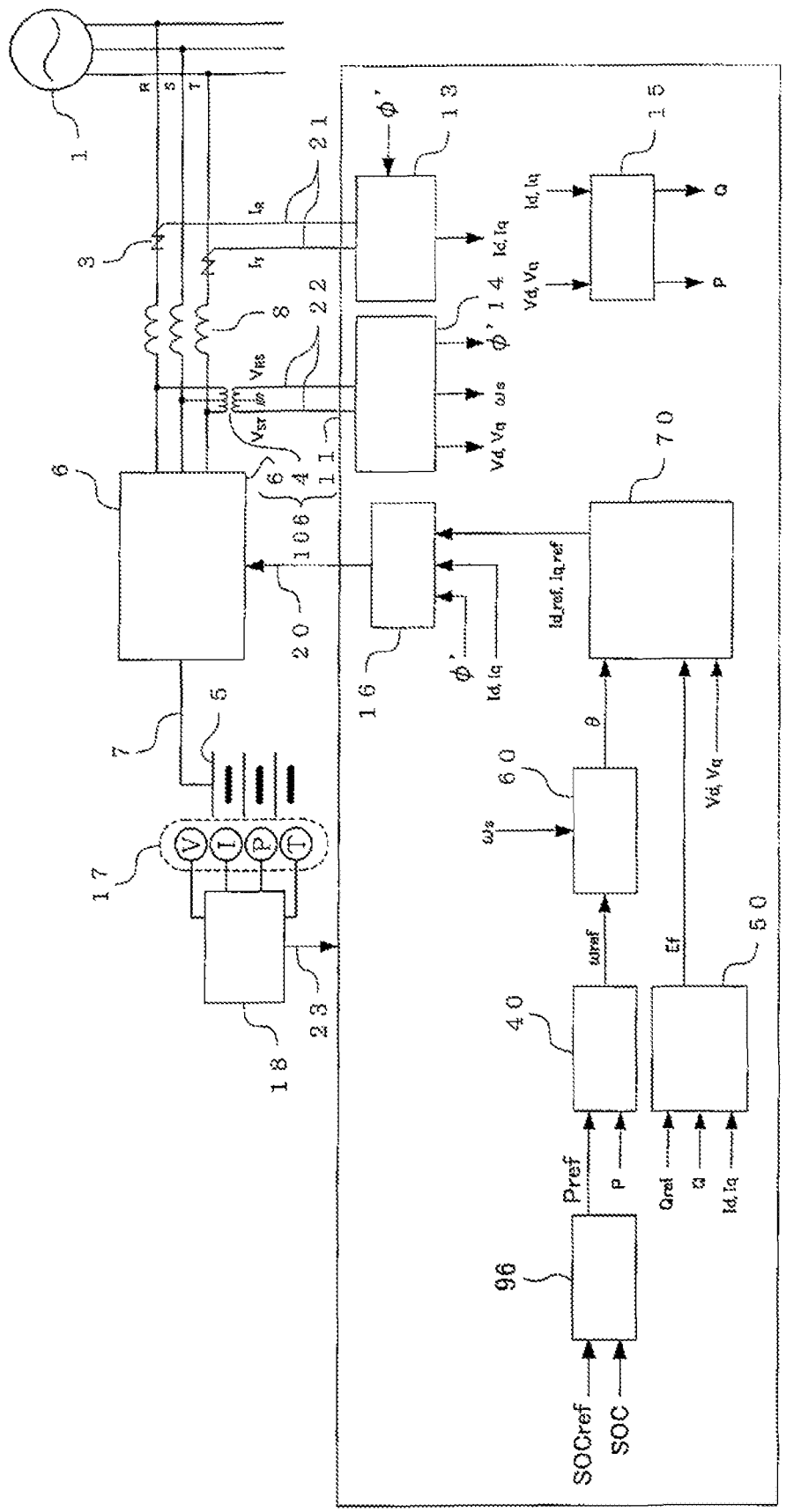
FIG. 1A is a diagram illustrating a control block of a power converter for an electricity storage facility.

A power converting apparatus for a combined power generation system according to the embodiment of the present invention will be described with reference to FIG. 1A to FIG. 1D. FIG. 1A is a diagram illustrating a control block of the power converting apparatus for an electricity storage facility in the combined power generation system.

A secondary battery 5 is connected to a secondary battery power conversion circuit 6 (hereinafter, simply a power conversion circuit) via a DC power line 7. The power conversion circuit 6 turns ON/OFF a power semiconductor element, not shown, so as to convert a DC power from the secondary battery 5 into a predetermined AC power and output it to an AC power supply system 1, or convert an AC power from the AC power supply system 1 into a DC power and charge secondary battery 5. An electric double layer capacitor may be used as an electricity storage device instead of the secondary battery.

A voltage detector 4 for detecting a voltage of the power supply system, and a current detector 3 for detecting an electric current flowing in the power conversion circuit 6 are installed in the AC power supply system 1. An output of the voltage detector 4 is connected to a voltage/frequency/phase calculator 14 of a secondary battery system control device 11 (a first system control device: hereinafter, simply a system control device) via a wiring 22. Further, an output of the current detector 3 is connected to a current calculator 13 of the system control device 11 via a wiring 21. The voltage detector 4 is a transformer known as a PT (Potential Transformer), and the current detector 3 is a current transformer known as a CT (Current Transformer).

The system control device 11 is composed of an active power command value calculator 96, the current calculator 13, the voltage/frequency/phase calculator 14, an active/reactive power calculator 15, a frequency command value calculator 40, an internal electromotive voltage command value calculator 50, an internal phase difference angle calculator 60, a current command value calculator 70, and a power converting apparatus controller 16.

A gate driving signal 20 from the power converting apparatus controller 16 is sent to the power conversion circuit 6. The gate driving signal 20 PWM-controls a gate of the power semiconductor element, and a DC power of the secondary battery 5 is converted into an AC power of desired voltage, frequency and phase so as to be supplied to the AC power supply system 1. In another manner, an AC power from the AC power supply system 1 is converted into a DC power so as to charge the secondary battery 5.

A state detector 17 for detecting a state of the secondary battery such as a voltage, an electric current, a temperature and a pressure is installed in the secondary battery 5. A secondary battery monitoring device 18 monitors the state of the secondary battery and calculates SOC (State Of Charge) of the secondary battery 5 based on a signal from the state detector 17.

When the secondary battery monitoring device 18 is connected to the system control device 11 via a wiring 23 and anomalia is detected in the state of the secondary battery 5, the operation of the power conversion circuit 6 is stopped via the power converting apparatus controller 16. At the same time, the SOC of the secondary battery is transmitted to the system control device 11.

The power converting apparatus for the combined power generation system according to the embodiment of the present invention will be described in detail below with reference to FIG. 2 to FIG. 6.

(1) The Voltage/Frequency/Phase Calculator and the PLL Calculator

Figure 2A:
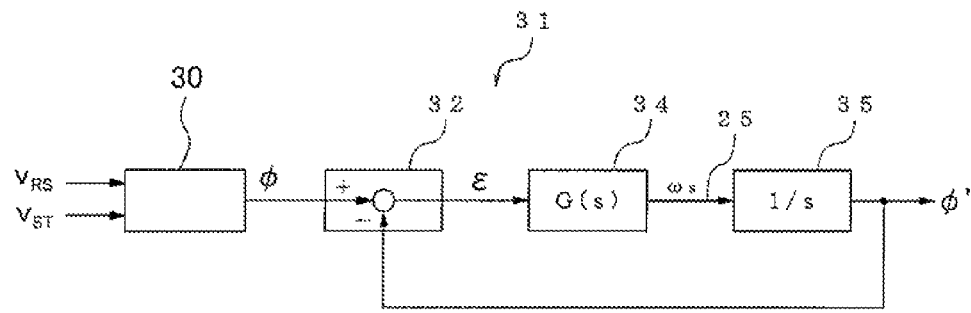
FIG. 2A is a block diagram of a PLL calculating circuit in a voltage/frequency/phase calculator of the control block in FIG. 1A.
Figure 2B:
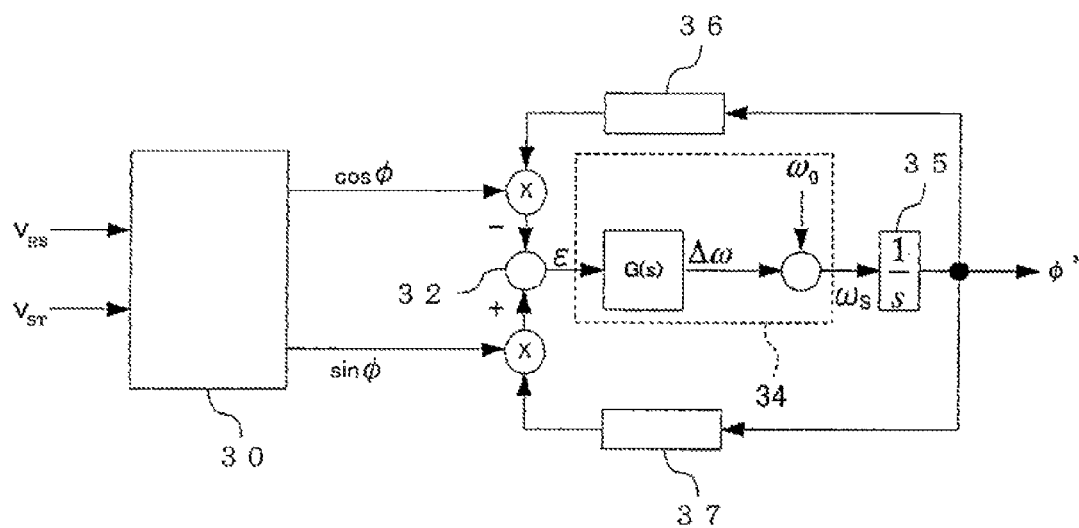
FIG. 2B is a block diagram for describing contents of a calculating process of the PLL calculating circuit in the voltage/frequency/phase calculator in the control block of FIG. 1A.

FIG. 2A and FIG. 2B are diagrams describing a PLL calculating circuit 31 in the voltage/frequency/phase calculator 14. The voltage and the frequency of the AC power supply system 1 are calculated by the PLL calculating circuit 31. That is to say, the PLL calculating circuit 31 functions as a frequency obtaining section. FIG. 2A is a block diagram of a PLL calculator (the PLL calculating circuit 31), and FIG. 2B is a block diagram for describing contents of a calculating process in the PLL calculator (the PLL calculating circuit 31) for calculating a system voltage, a system frequency, and a phase.

The frequency and the phase of the AC power supply system 1 are obtained by calculation in the PLL calculating circuit 31 based on a voltage signal from the voltage detector 4. Concretely, the voltage detector 4 provided to the power conversion circuit 6 measures instantaneous values vRS and vST of a line voltage of the AC power supply system 1, and inputs them into the PLL calculating circuit 31. The PLL calculating circuit 31 estimates to calculate the frequency and the phase of the AC power supply system 1 using the instantaneous values vRS and vST of this voltage.

In a calculation block diagram of the PLL calculating circuit 31 shown in FIG. 2A and FIG. 2B, the PLL calculating circuit 31 is composed of an αβ converter 30 for calculating a phase φ based on line voltage values (vRS, vST), a phase comparator 32 for obtaining a deviation between the phase φ calculated by the αβ converter 30 and a phase (hereinafter, estimated phase) φ' estimated in the PLL calculating circuit 31, a loop filter 34 for estimating an angular velocity (frequency) of the AC power supply system 1 based on the phase deviation, and an integrator 35 for integrating the estimated angular velocity so as to calculate the estimated phase φ'.

The phase φ of the power supply system 1 is obtained by αβ-converting the instantaneous values vRS and vST of the system line voltage obtained from the voltage detector 4. Instantaneous values of respective phase voltages on the system side are denoted by vR, vS, and vT, and an instantaneous value vector vαβ is defined as expressed in the following formula.

$$v_{\alpha\beta} = \sqrt{\frac{2}{3}}\left(v_R + v_S e^{j\frac{2\pi}{3}} + v_T e^{j\frac{4\pi}{3}}\right) \quad \text{[Mathematical Formula 1]}$$

The instantaneous value vector vαβ can be expressed as follows according to an Euler's expression ($e^{j\Phi}$=cos φ+j·sin φ).

$$v_{\alpha\beta} = v_\alpha + jv_\beta = \sqrt{\frac{2}{3}}\left\{\left(v_R - \frac{1}{2}v_S - \frac{1}{2}v_T\right) + j\left(\frac{\sqrt{3}}{2}v_S - \frac{\sqrt{3}}{2}v_T\right)\right\} \quad \text{[Mathematical Formula 2]}$$

$$\begin{bmatrix}v_\alpha\\v_\beta\end{bmatrix} = \sqrt{\frac{2}{3}}\begin{bmatrix}1 & -1/2 & -1/2\\0 & \sqrt{3}/2 & -\sqrt{3}/2\end{bmatrix}\begin{bmatrix}v_R\\v_S\\v_T\end{bmatrix} \quad \text{[Mathematical Formula 3]}$$

The instantaneous value vector vαβ is a vector such that a fixed coordinate system (αβ axis) that is on the basis of an a-phase is rotated at an angular velocity ω.

The system instantaneous line voltages vRS and vST and the instantaneous phase voltages vR, vS, and vT measured actually by the voltage detector 4 establish the following formula.

$$v_{RS} = v_R - v_S \quad \text{[Mathematical Formula 4]}$$

$$v_{ST} = v_S - v_T \quad \text{[Mathematical Formula 5]}$$

Therefore, the instantaneous value vector is obtained based on the instantaneous line voltage as follows.

$$v_\alpha = \sqrt{\frac{2}{3}}\left(v_R - \frac{1}{2}v_S - \frac{1}{2}v_T\right) = \sqrt{\frac{2}{3}}\left(v_R - v_S + \frac{1}{2}v_S - \frac{1}{2}v_T\right) = \sqrt{\frac{2}{3}}(v_{RS} + v_{ST}) \quad \text{[Mathematical Formula 6]}$$

$$v_\beta = \sqrt{\frac{2}{3}}\left(\frac{\sqrt{3}}{2}v_S - \frac{\sqrt{3}}{2}v_T\right) = \frac{1}{\sqrt{2}}v_{ST} \quad \text{[Mathematical Formula 7]}$$

Further, the αβ converter 30 converts cos φ and sin φ according to the following formula.

$$\cos\phi = \frac{v_\alpha}{\sqrt{v_\alpha^2 + v_\beta^2}} \quad \text{[Mathematical Formula 8]}$$

$$\sin\phi = \frac{v_\beta}{\sqrt{v_\alpha^2 + v_\beta^2}} \quad \text{[Mathematical Formula 9]}$$

A product of an output from a sin converter 36 and an output cos φ from the αβ converter 30, and a product of an output from a cos converter 37 and an output sin φ from the αβ converter 30 are input into the phase comparator 32. The phase comparator 32 obtains a deviation φ-φ' (hereinafter, phase deviation) between the phase φ obtained from the instantaneous value of the system voltage and the phase φ' estimated in the PLL calculating circuit 31. Concretely, the phase deviation is calculated by the following calculation. The output E (see FIG. 2B) from the αβ converter 30 is obtained by Mathematical Formula 10 according to the Euler's equation.

$$\varepsilon = \sin\phi\cos\phi' - \cos\phi\sin\phi' = \sin(\phi - \phi') \quad \text{[Mathematical Formula 10]}$$

Therefore, when φ-φ' is sufficiently small, ε=sin(φ-φ') is approximately equal to φ-φ', ε is regarded as the phase deviation φ-φ'.

The loop filter 34 obtains a system frequency based on the phase deviation obtained by the phase comparator 32. A system synchronizing frequency (estimated synchronizing frequency) ωs is obtained based on the output from the loop filter 34. A transfer function G(s) of the loop filter is expressed by the following formula.

$$G(s) = K_P\left(1 + \frac{1}{sT_I}\right) \quad \text{[Mathematical Formula 11]}$$

The estimated synchronizing frequency ωs is integrated by the integrator 35 so as to obtain an estimated phase angle φ'.

A dq coordinate system that rotates at wt with respect to the αβ coordinate system is assumed, and the voltage of the system is obtained by dq conversion. That is to say, a voltage in the dq coordinate system is obtained as follows.

$$\dot{V}_{dq} = e^{-j\omega t}\dot{V}_{\alpha\beta} \quad \text{[Mathematical Formula 12]}$$

$$\begin{bmatrix}V_d\\V_q\end{bmatrix} = \begin{bmatrix}\cos\omega t & \sin\omega t\\-\sin\omega t & \cos\omega t\end{bmatrix}\begin{bmatrix}V_\alpha\\V_\beta\end{bmatrix} \quad \text{[Mathematical Formula 13]}$$

In the above manner, the voltage/frequency/phase calculator 14 calculates the voltages Vd and Vq, the estimated synchronizing frequency ωs, and the phase φ based on the instantaneous value vRS and vST of the line voltage from the voltage detector 4.

(2) The Current Calculator

The current calculator 13 calculates the electric currents Id and Iq using the estimated phase φ' calculated by the voltage/frequency/phase calculator 14 as an input.

$$i_R + i_S + i_T = 0$$
$$\rightarrow i_S = -i_R - i_T \quad \text{[Mathematical Formula 14]}$$

Therefore, the current vector in the dq coordinate system is expressed by the following formula.

$$\begin{bmatrix}I_d\\I_q\end{bmatrix} = \quad \text{[Mathematical Formula 15]}$$

$$\begin{bmatrix}\cos\phi & \cos\left(\phi - \frac{2}{3}\pi\right) & \cos\left(\phi - \frac{4}{3}\pi\right)\\-\sin\phi & -\sin\left(\phi - \frac{2}{3}\pi\right) & -\sin\left(\phi - \frac{4}{3}\pi\right)\end{bmatrix}$$

$$\begin{bmatrix} i_R \\ i_S \\ i_T \end{bmatrix}$$

(3) The Active/Reactive Power Calculator

The active/reactive power calculator 15 calculates an active power P and a reactive power Q using the voltages Vd and Vq and the electric currents Id and Iq calculated by the voltage/frequency/phase calculator 14 and the current calculator 13 as inputs.

$$P = V_d I_d + V_q I_q$$

$$Q = -V_d I_q + V_q I_d \qquad \text{[Mathematical Formula 16]}$$

(4) The Active Power Command Value Calculator

Figure 1B:
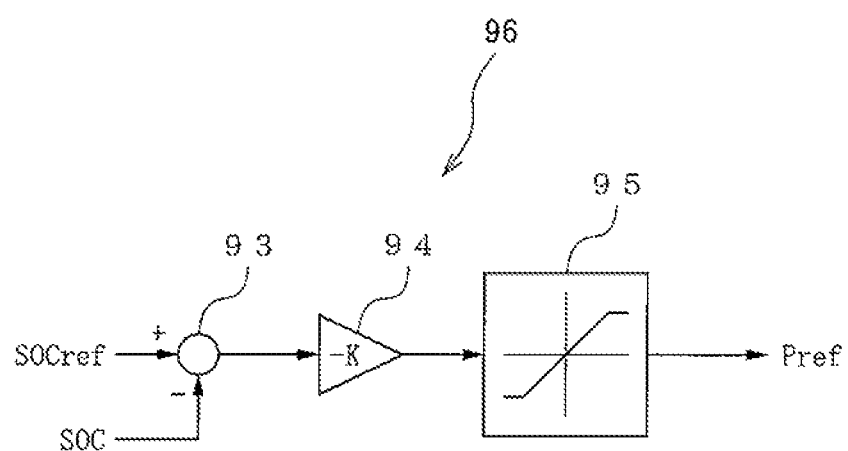
FIG. 1B is a diagram illustrating a logic for calculating an active power command value in FIG. 1A.

The active power command value calculator 96 proportions and calculates a deviation between the SOC of the secondary battery 5 and a SOC command value SOCref of the secondary battery 5 so as to calculate an active power command value Pref. The active power command value Pref is calculated by a method shown in the control block of FIG. 1B. In FIG. 1B, a subtracter 93 calculates a deviation between the SOC command value SOCref and the SOC calculated by the secondary battery monitoring device 18 so as to output the calculated deviation to a proportioning controller 94. The proportioning controller 94 inverts polarity of an output from the subtracter 93, and multiplies the inverted output by a proportional gain K so as to send the output to an upper/lower limit setting unit 95 at a next stage. The upper/lower limit setting unit 95 outputs the active power command value Pref to the frequency command value calculator 40.

(5) The Frequency Command Value Calculator

Figure 3A:
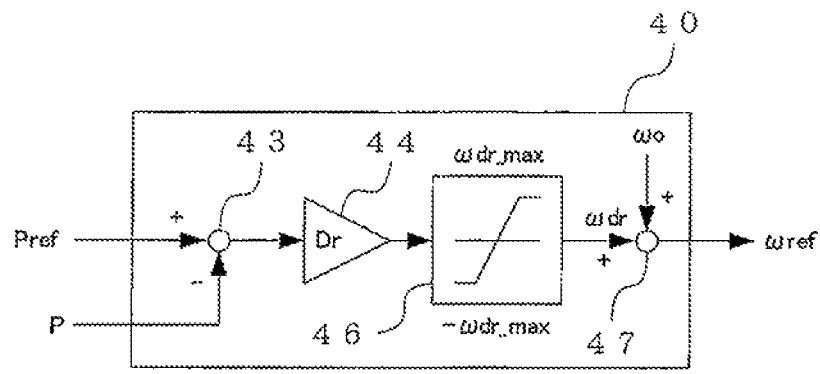
FIG. 3A is one example of a block diagram illustrating a calculating circuit of a frequency command value calculator in a system control device.

The frequency command value calculator 40 calculates a frequency command value ωref by proportioning control based on a deviation between the active power command value Pref and the active power P. FIG. 3A is one example of a block diagram illustrating a calculating circuit of the frequency command value calculator 40 in the control block of FIG. 1A. That is to say, as shown in FIG. 3A, a subtracter 43 subtracts the active power P from the active power command value Pref so as to output the value to a proportioning controller 44. The proportioning controller 44 multiplies an output from the subtracter 43 by a proportional gain (Dr) so as to send the output to an upper/lower limiter 46 at a next stage. The upper/lower limiter 46, then, limits an output from the proportioning controller 44 to a value between ωdr_max and φdr_min so as to output it. An adder 47 adds a reference frequency co to an output from the upper/lower limiter 46 so as to output it as the frequency command value ωref.

Figure 3B:
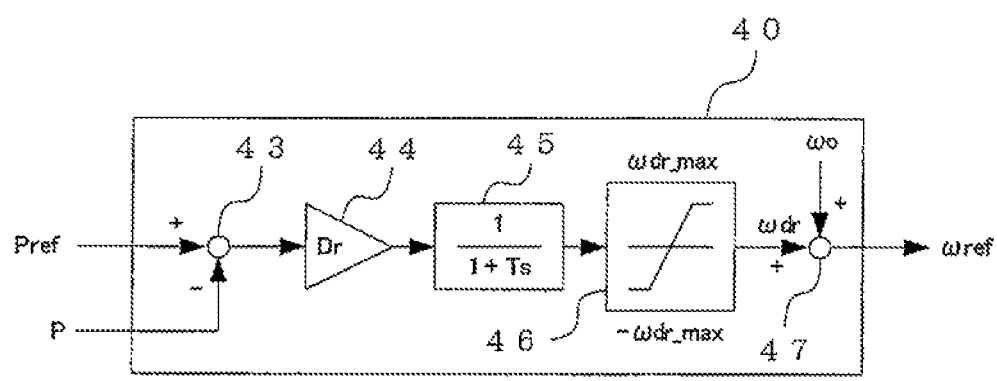
FIG. 3B is another example of the block diagram illustrating the calculating circuit of the frequency command value calculator in the system control device.

FIG. 3B illustrates another embodiment of the calculating circuit of the frequency command value calculator 40 in the control block of FIG. 1A. That is to say, as shown in FIG. 3B instead of FIG. 3A, a first-order lag calculator 45 may be disposed between the proportioning controller 44 and the upper/lower limiter 46. The proportional gain (Dr) of the proportioning controller 44 is adjusted so that a predetermined dropping characteristic is provided between the active power and the frequency.

(6) The Internal Electromotive Voltage Command Value Calculator

Figure 4A:
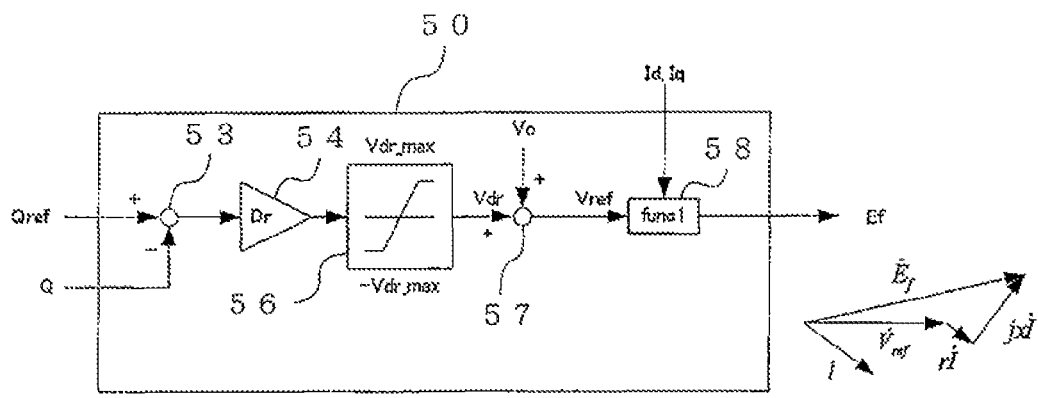
FIG. 4A is one example of a block diagram illustrating a calculating circuit of an internal electromotive voltage command value calculator in the system control device.

FIG. 4A is a block diagram illustrating a calculating circuit of the internal electromotive voltage command value calculator 50 in the control block of FIG. 1A. As shown in FIG. 4A, the internal electromotive voltage command value calculator 50 calculates an internal electromotive voltage command value Ef by the proportioning control based on a deviation between a reactive power command value Qref and the reactive power Q. Concretely, a subtracter 53 subtracts the reactive power Q from the reactive power command value Qref so as to output the value to a proportioning controller 54. The proportioning controller 54 multiplies an output from the subtracter 53 by the proportional gain (Dr) so as to send the output to an upper/lower limiter 56 at a next stage. The upper/lower limiter 56 limits an output from the proportioning controller 54 to a value between Vdr_max and Vdr_min so as to output it. An adder 57 adds a voltage reference value Vo to an output from the upper/lower limiter 56 so as to output a voltage command value Vref. A voltage target value Vref is sent to a function calculator 58. The function calculator 58 makes a calculation expressed by the following formula so as to output the internal electromotive voltage command value Ef.

$$E_{fd} = V_{ref} + rI_d - xI_q$$

$$E_{fq} = rI_q + xI_d$$

$$E_f = \sqrt{E_{fd}^2 + E_{fq}^2} \qquad \text{[Mathematical Formula 17]}$$

Figure 6A:
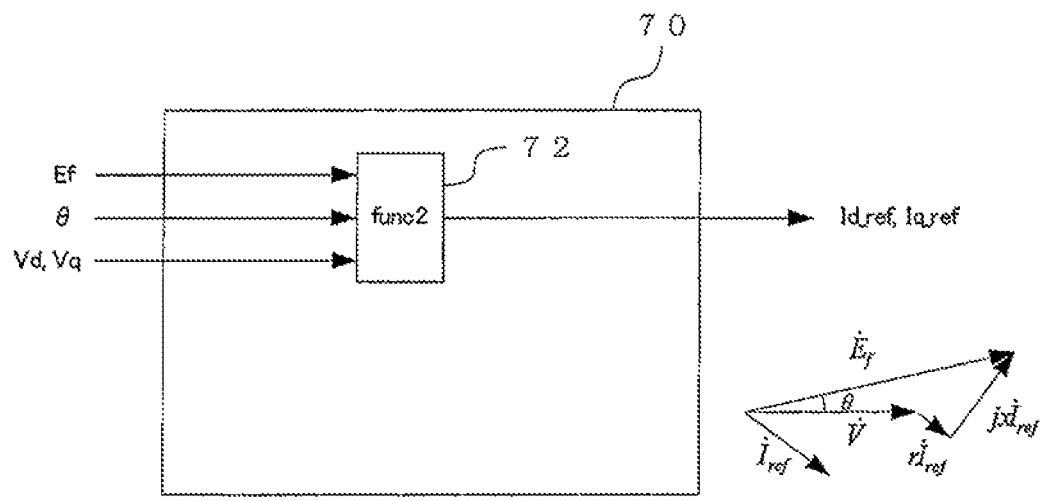
FIG. 6A is one example of a block diagram illustrating a calculating circuit of a current command value calculator in the system control device.
Figure 6B:
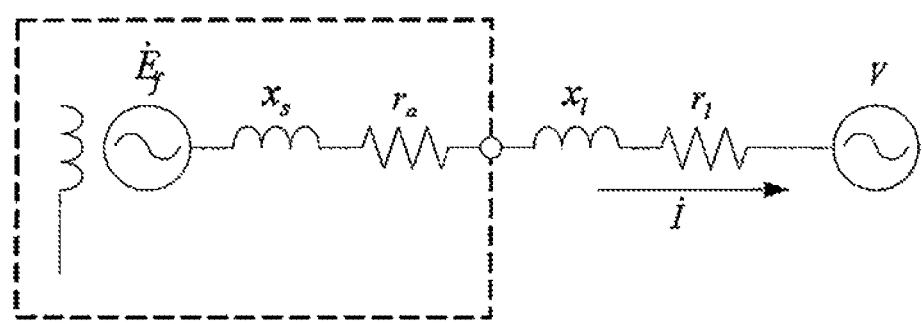
FIG. 6B is a diagram illustrating a virtual voltage control type power converting apparatus.

The internal electromotive voltage command value Ef obtained by the above formula can be regarded as a value obtained by subtracting a voltage drop caused by total impedance (r, x) that is a sum of internal impedance of the electricity storage facility and the external impedance between the electricity storage facility and the power supply system from the voltage target value Vref that is an output from a second adder 57 (see FIG. 6B). FIG. 6B is one example of a system diagram illustrating a virtual voltage control type power converting apparatus.

Figure 4B:
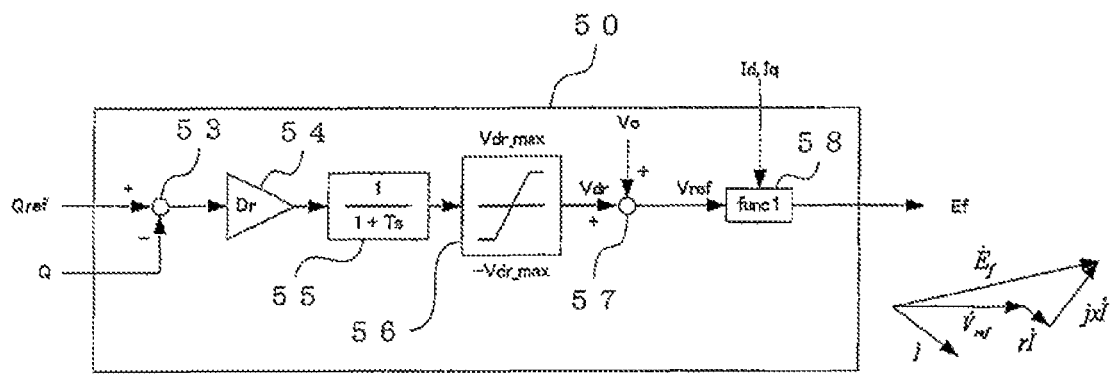
FIG. 4B is another example of the block diagram illustrating the calculating circuit of the internal electromotive voltage command value calculator in the system control device.

FIG. 4B is a block diagram illustrating another embodiment of the internal electromotive voltage command value calculator in the control block of FIG. 1A. That is to say, as shown in FIG. 4B instead of FIG. 4A, a first-order lag calculator 55 may be disposed between the proportioning controller 54 and the upper/lower limiter 56. The proportional gain (Dr) is adjusted so that a predetermined dropping characteristic is provided between a reactive power and an output voltage.

(7) The Internal Phase Difference Angle Calculator

Figure 5A:
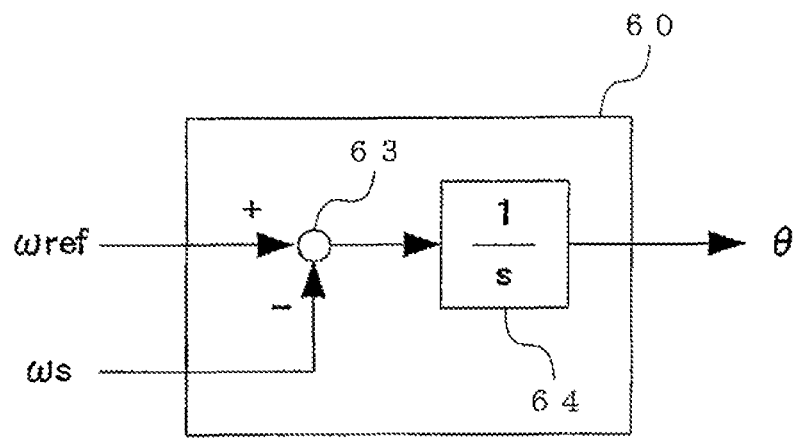
FIG. 5 is one example of a block diagram illustrating a calculating circuit of an internal phase difference angle calculator in the system control device.

FIG. 5 is a block diagram illustrating the calculating circuit of the internal phase difference angle calculator in the control block of FIG. 1A. As shown in FIG. 5, the internal phase difference angle calculator 60 calculates an internal phase difference angle θ based on a deviation between the frequency command value ωref and the estimated synchronizing frequency φs. Concretely, a subtracter 63 calculates the deviation between the frequency command value ωref and the estimated synchronizing frequency ωs. An integrator 64 to be disposed at a next stage of the subtracter 63 integrates the deviation so as to output it as the internal phase difference angle θ. In this embodiment, the constitution is such that frequencies are compared by using the frequency command value ωref and the estimated synchronizing frequency ωs, but may be such that angular velocities (unit: rad/sec), rotation numbers (unit: l/sec) or rotating speeds (unit: rpm) are compared. The angular velocity, the rotation number, and the rotating speed are concepts equivalent to the frequency in the present invention.

(8) The Current Command Value Calculator

FIG. 6A is a block diagram illustrating a calculating circuit of the current command value calculator 70 in the control block of FIG. 1A. As shown in FIG. 6A, in the current command value calculator 70, the internal electromotive voltage command value Ef, the internal phase difference angle θ, and voltages Vd and Vq are input into a function calculator 72. The function calculator 72 makes a calculation of the following formula, and outputs current command values Id_ref and Iq_ref to the power converting apparatus controller 16.

$$\Delta V_d + j\Delta V_q = \quad\quad\quad \text{[Mathematical Formula 18]}$$
$$(E_f\cos\theta - V_d) + j(E_f\sin\theta - V_q)$$
$$I_{d\_ref} = \frac{1}{r^2 + x^2}(r\Delta V_d + x\Delta V_q)$$
$$I_{g\_ref} = \frac{1}{r^2 + x^2}(r\Delta V_q - x\Delta V_q)$$

A current value obtained by the above formula is a value of the current flowing in a total impedance when the total impedance is supposed to be connected between a power supply of the system voltage measured by a voltage measuring device and a power supply of an internal electromotive voltage command value voltage. This current value is output as a current command value from the current command value calculator 70 (see FIG. 6B).

Actual internal impedances ra and xs of an electricity storage device are approximately zero, and the total impedances r=ra+rl and x=xs+xl are approximately equal to external impedances rl and xl between the electricity storage facility and the power supply system. However, as described above, in this embodiment, when the internal electromotive voltage command value Ef and the current command values Id_ref and Iq_ref are calculated, the total impedance that is a sum of the internal impedance of the electricity storage facility, and the external impedance between the electricity storage facility and the power supply system is used. Particularly, the internal impedance of the electricity storage device can be increased virtually so that the total impedance is obtained, and the internal electromotive voltage command value Ef, and the current command values Id_ref and Iq_ref are calculated by using this virtual impedance. As a result, the stable operation is enabled. This is because when a plurality of voltage control type power converting apparatuses is operated in parallel, outputs between the power converting apparatuses are greatly imbalanced due to low impedances of the power converting apparatuses, but an virtual increase in the internal impedance of the electricity storage device heightens the impedances of the power converting apparatuses, and thus unstable output balance caused by a voltage difference can be prevented.

That is to say, the current command value calculator 70 estimates a current value that is output to the system when a virtual voltage control type power converting apparatus generates the internal electromotive voltage obtained by the internal electromotive voltage command value calculator and the internal phase difference angle calculator.

As a result, apparent impedances of the power converting apparatuses rise and thus an unstable state of the system is suppressed in both cases of the linkage operation with the system and the parallel operation of the power converting apparatuses.

(9) The Power Converting Apparatus Controller

The estimated phase φ' calculated by the voltage/frequency/phase calculator 14, the electric currents Id and Iq calculated by the current calculator 13, and the current command values Id_ref and Iq_ref calculated by the current command value calculator 70 are input into the power converting apparatus controller 16. The power converting apparatus controller 16 outputs the gate driving signal 20 so that an output current form the power conversion circuit 6 becomes a current command value calculated by the current command value calculator 70.

In the secondary battery monitoring device 18, when anomalia is found in the secondary battery 5, a battery anomalous signal is sent to the power converting apparatus controller 16 of the system control device 11 via the wiring 23, and transmission of the gate driving signal 20 is stopped. As a result, since the operation of the power conversion circuit 6 is stopped, the secondary battery 5 is protected. Examples of the anomalia of the secondary battery are an excess current, a voltage drop, an excess voltage, excess charging, excess discharging, anomalous battery temperature, an anomalous battery pressure, and an anomalous apparatus.

The secondary battery monitoring device 18 calculates the SOC of the secondary battery 5, and transmits the SOC to the system control device 11 via the wiring 23. The SOC is calculated by correcting SOC (integrated SOC) obtained by integrating an electric current flowing in the secondary battery using SOC (instantaneous SOC) obtained from an electric current, a voltage, and a temperature.

When the SOC of the secondary battery 5 is smaller than the SOC command value that is a target, the power converter 6 makes a control so that the output of the active power is reduced. On the contrary, when the SOC is larger than the SOC command value as the target, it makes a control so that the output of the active power increases. As a result, the SOC of the secondary battery is maintained within an appropriate range.

Figure 1C:
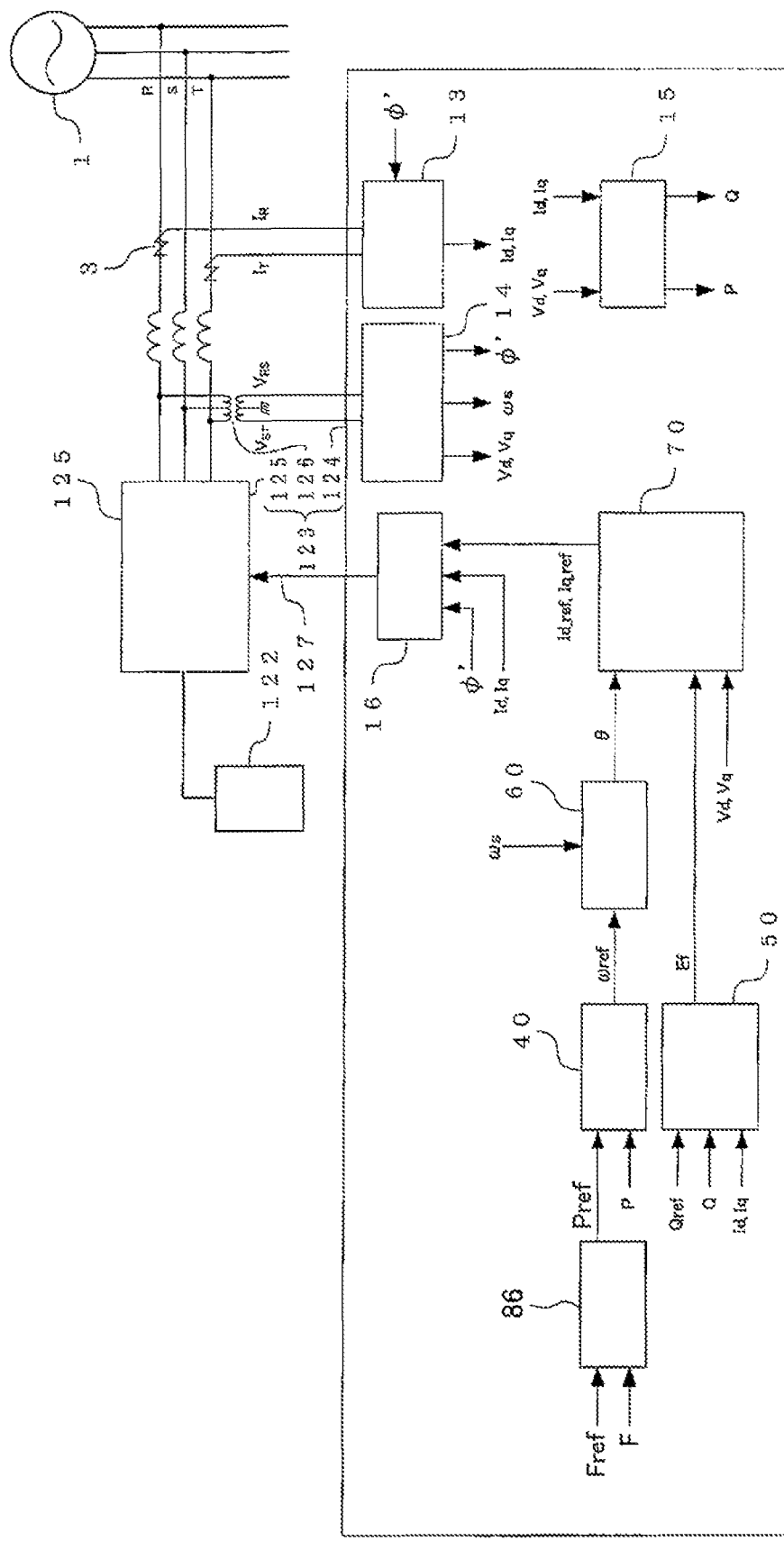
FIG. 1C is a diagram illustrating a control block of the power converter for a fuel cell power generation facility.

The control block of the power converting apparatus for the power generation facility will be described below with reference to FIG. 1C. FIG. 1C illustrates a case where a fuel cell power generation facility is employed as the power generation facility. As shown in FIG. 1C, the fuel cell power generation facility includes a fuel cell 122 and a fuel cell power converting apparatus 123. As described later, the similar constitution can be applied to a case where a power generation facility (for example, motor power generator such as a binary power generator) other than the fuel cell power generation facility is employed as the power generation facility. Hereinafter, description about portions common with the control block of the secondary battery system control device 11 shown in FIG. 1A will be omitted, and only different points will be described.

In FIG. 1C, the fuel cell 122 is connected as the power generation facility instead of the secondary battery 5 in FIG. 1A. The fuel cell 122 is connected to a fuel cell power conversion circuit 125. A voltage detector 126 is connected to an output of the fuel cell power conversion circuit 125. The fuel cell power conversion circuit 125 receives a gate driving signal 127 from a fuel cell system control device 124 via a wiring. In FIG. 1C, a secondary battery monitoring device is not provided.

Figure 1D:
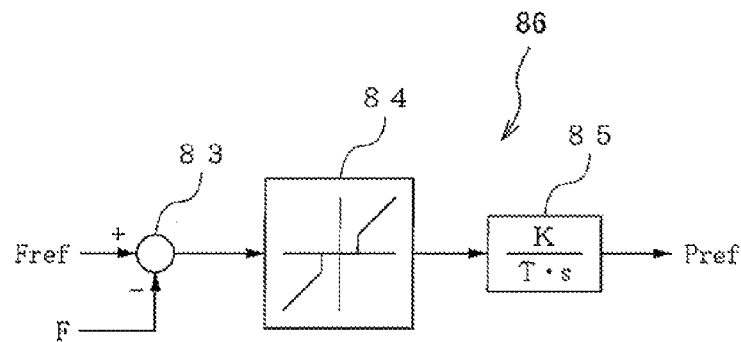
FIG. 1D is a diagram illustrating a logic for calculating the active power command value in FIG. 1C.

An active power command value calculator 86 proportions and calculates a deviation between a frequency F of the fuel cell 122 and a frequency command value Fref of the fuel cell 122 so as to calculate the active power command value Pref. The active power command value Pref is calculated by a method shown in the control block of FIG. 1D. In FIG. 1D, a subtracter 83 calculates a deviation between the frequency command value Fref and the frequency F so as to send it to a dead zone calculator 84. The dead zone calculator 84 outputs the same value as the input in a zone with large deviation and outputs 0 in a zone with small deviation. The dead zone bears a responsibility for preventing an inclination of the frequency command value Fref to one direction caused by a small deviation. The signal output from the dead zone calculator 84 is integrated by an integration controller 85, so that the active power command value Pref is obtained. The active power command value Pref is input into the frequency command value calculator 40.

Figure 7:
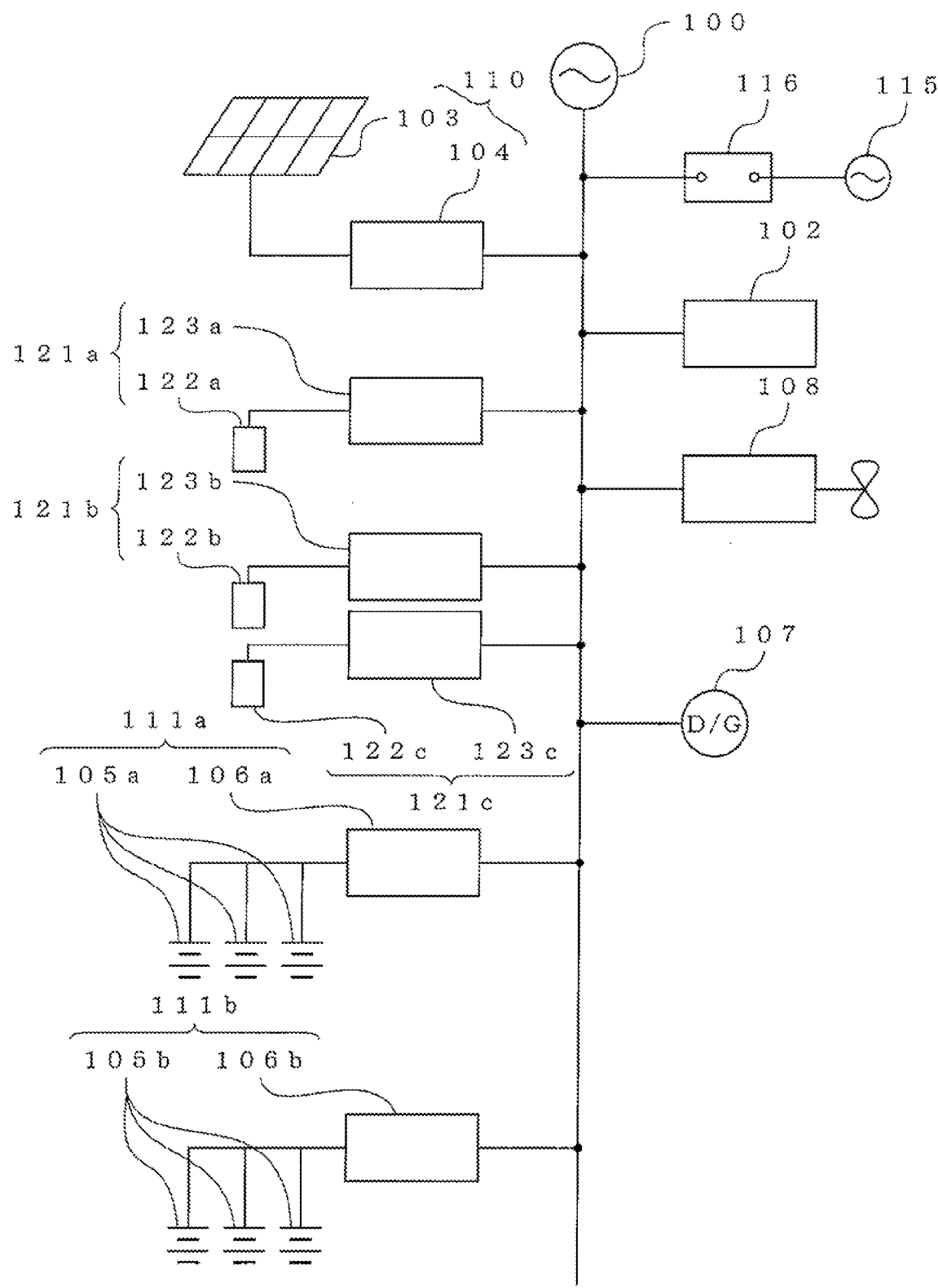
FIG. 7 is one example of a diagram of the power supply system.

FIG. 7 illustrates one example of the power supply system diagram of the combined power generation system according to the embodiment of the present invention. An in-vessel power supply system 100 is not particularly concrete, but it suffices to say that it is composed of a wiring, various power generators and a load facility to be connected to the wring.

A three-phase AC power is applied to the in-vessel power supply system 100 (hereinafter, simply power supply system), but it is shown as a single line system diagram in order to simplify the drawing in FIG. 7. The power supply system shown in FIG. 7 is in a vessel, but the present invention can be applied also to a microgrid.

The power supply system 100 adopts three-phase alternating with a nominal voltage of 440 V and a nominal frequency of 60 Hz, and various facilities are connected to this system. That is to say, the photovoltaic power generator 110 composed of a solar battery unit 103 and a power converter 104, the electricity storage facility 111 composed of a secondary battery 105 and the power converting apparatus, a fuel cell power generation facility 121 composed of the fuel cell 122 and the fuel cell power converting apparatus 123, and a diesel power generator 107 are connected to a power supply side of the power supply system 100 in FIG. 7.

An in-vessel power load 102 and a bow thruster 108 are connected to a load side of the power supply system 100 in FIG. 7. An electric power to be consumed by lightening and air conditioning in a vessel becomes the in-vessel power load 102. The bow thruster 108 is provided for moving a vessel to a quay during entering port without help of a tugboat, and is driven by a large induction motor.

Basically, an electric power necessary in a vessel is covered by the fuel cell power generation facility 121. The natural energy such as the photovoltaic power generator 110 is occasionally used, but since the natural energy cannot normally control the generating power, it moves the power supply system to an unstable direction. The electricity storage facility 111 of the present invention is provided so as to compensate a transient load fluctuation that cannot be followed by the fuel cell power generation facility 121 (for example, shutdown of the bow thruster 108) and disturbance in the system caused by the photovoltaic power generator 110.

When a vessel comes alongside a pier, the power required in the vessel is covered by a commercial electric power system. For this reason, after the vessel comes alongside the pier, a circuit breaker 116 for system interconnection closes the circuit in consort with a synchronous input control device, not shown, so that the power supply system 100 is linked with a commercial electric power system 115 via the circuit breaker 116.

An isolated operation of the secondary battery system control device 11 (hereinafter, simply the system control device) will be described. That is to say, when another power generation facility is not connected in FIG. 1A, the operation of the system control device 11 in a case where a process amount changes will be described.

When in-vessel loads (102, 108) increase in the in-vessel power supply system 100, a synchronous frequency (estimated synchronous frequency) $\omega s$ decreases due to droop characteristics. When the synchronous frequency $\omega s$ decreases, in the internal phase difference angle calculator 60, the output of the subtracter 63 that is zero in a settling state is changed into a positive value. For this reason, the output from the integrator 64 increases, and the internal phase difference angle $\theta$ increases. As a result, since the current command value Id_ref calculated by the current command value calculator 70 increases, a d-axial current to be output from a power converting apparatus 106 also increases. As a result, the active power P increases, and the decreased synchronous frequency $\phi s$ increases so as to try to return to an original value. However, the synchronous frequency $\omega s$ does not return to a value before the increase in the in-vessel load.

On the other hand, the output from the subtracter 43 of the frequency command value calculator 40 reduced due to the increase in the active power P. As a result, the frequency command value $\omega ref$ that is the output from the frequency command value calculator 40 reduces. As a result, the synchronous frequency ms is balanced against the frequency command value $\omega ref$ so that an output from the subtracter 63 of the internal phase difference angle calculator 60 becomes 0. As a result, the increase in the output from the integrator 64 stops, and the internal phase difference angle $\theta$ is settled to a value after the increase in the in-vessel load.

When the consumption of the reactive power Q in the in-vessel loads (102, 108) increases, the internal electromotive voltage command value Ef that is the output from the internal electromotive voltage command value calculator 50 increases, and the current command value Iq_ref that is the output from the current command value calculator 70 increases. As a result, the power converting apparatus 106 supplies the necessary reactive power Q. During this time, a load power factor of the in-vehicle power supply system 101 temporarily reduces.

Transient response between the system control device 11 and a system control device 124 in a case where the electricity storage facility 111 and the fuel cell power generation facility 121 are connected to the power supply system 1 will be described below with reference to FIG. 1, FIG. 3B, FIG. 7, and FIG. 8. A case where the in-vessel loads (102, 108) increase will be described here.

Figure 8A:
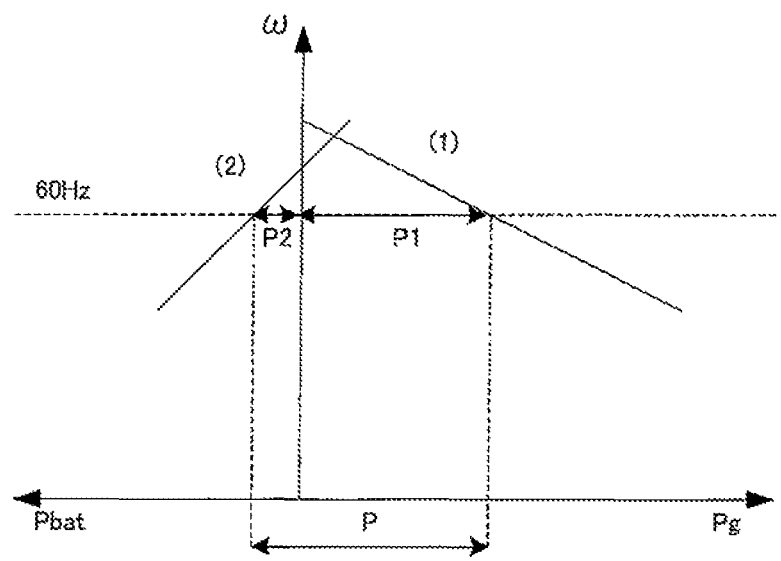
FIG. 8A is a diagram for explaining a dropping characteristic in a case where the fuel cell power generation facility is linked with the system.

A viewing manner of FIG. 8 will be described first. FIG. 8A illustrates a state that a system frequency and the load sharing of the electricity storage facility 111 and the fuel cell power generation facility 121. A vertical axis represents a frequency co, and a horizontal axis represents the load sharing. A graph on a Pg side of the horizontal axis represents an output characteristic of the fuel cell power generation facility 121, a graph of a Pbat side of the horizontal axis represents an output characteristic of the electricity storage facility 111.

A tilt of each output characteristic is determined by the proportional gain Dr of the proportioning controller 44 in FIG. 3B. Further, the output characteristic of the fuel cell power generation facility 121 fluctuates in an up-down direction due to an output result in FIG. 1D. Similar, the output characteristic of the electricity storage facility 111 fluctuates in the up-down direction due to an output result in FIG. 1B.

Since the electricity storage facility 111 and the fuel cell power generation facility 121 operate in parallel, both frequencies have the same value. Further, the load sharing is statically determined on an output characteristic line of each power generation facility in a stationary state, but the operation is occasionally performed with the load sharing being deviated from the output characteristic line transitionally.

Figure 8B:
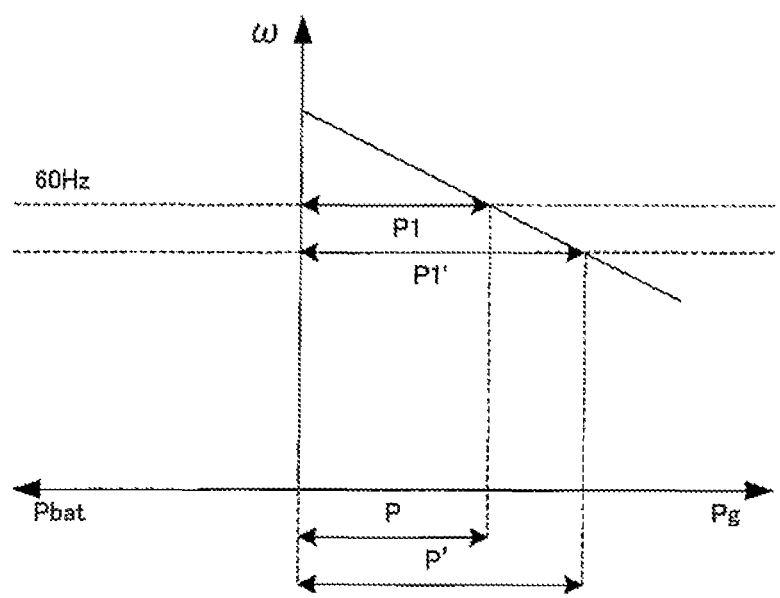
FIG. 8B is a diagram for explaining the dropping characteristic in the case where the fuel cell power generation facility is linked with the system.

A case where the load of the power supply system abruptly increases with only the fuel cell power generation facility 121 being connected as the power supply facility in the power supply system 1 shown in FIG. 7 will be described with reference to FIG. 8B. When the electric power of the system load in an initial state is determined by P, load sharing P1 of the fuel cell power generation facility 121 is equal to P, and the frequency is 60 Hz. When the electric power of the system load increases to P', just after the increase, the load sharing of the fuel cell power generation facility 121 changes into P1' with the frequency being 60 Hz. Thereafter, the value ωref is reduced due to the characteristic of the frequency command calculator 40, and is statically determined on the characteristic curve.

At this time, a problem does not arise when a fuel is supplied to the fuel cell enough early, but if the fuel supply cannot follow the output fluctuation, the power is generated with the fuel being insufficient, and the polarity of the fuel cell might be damaged.

Figure 8C:
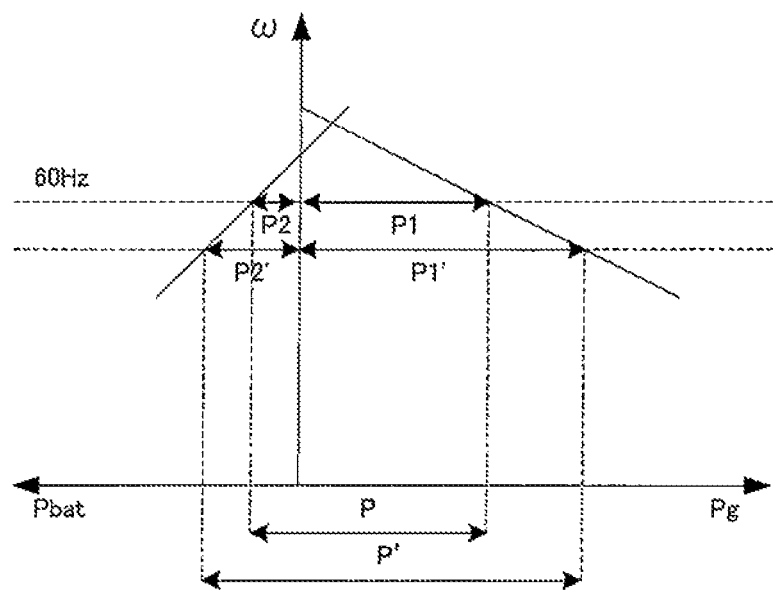
FIG. 8C is a diagram for explaining the dropping characteristic in the case where the fuel cell power generation facility is linked with the system.

Behavior in a case where the fuel cell power generation facility 121 and the electricity storage facility 111 are connected as power supply systems to the power supply system 1 will be described below with reference to FIG. 8C. The first-order lag calculators 45 of the frequency command calculators 40 in the fuel cell power generation facility 121 and the electricity storage facility 111 are set so as to have the same time constant.

When the system load power is P in the initial state, the fuel cell power generation facility 121 and the electricity storage facility 111 share the loads of P1 and P2 with the frequency of 60 Hz according to the respective output characteristics. When the system load power increases to P', the fluctuation is such that the sharing amount is increased according to a capacity ratio of each power generation facility, and the power generation facilities share P1' and P2', respectively, with the frequency of 60 Hz. Thereafter, the value ωref simultaneously reduces due to the characteristics of the frequency command calculators 40 of the respective power generation facilities and is statically determined on the output characteristic line with the sharing amounts P1' and P2' of the power generation facilities being maintained.

The fuel cell power generation facility 121 and the electricity storage facility 111 are operated in parallel, so that the load sharing amount of the fuel cell power generation facility is made to be less than the case of the operation using only the fuel cell power generation facility 121. Since the sharing amount of the load fluctuation becomes the capacity ratio of each power generation facility, when the capacity of the electricity storage facility 111 is smaller than the capacity of the fuel cell power generation facility 121, a sufficient effect might not be obtained.

Further, a case where different values are set as the time constants of the first-order lag calculators 45 of the frequency command calculators 40 in the fuel cell power generation facility 121 and the electricity storage facility 111 will be described with reference to FIG. 8D to FIG. 8H. The time constant of the first-order lag calculator 45 in the electricity storage facility 111 is set to be longer than the time constant of the first-order lag calculator 45 in the fuel cell power generation facility 121. Preferably, the time constant of the electricity storage facility 111 is set to be enough longer than the time constant of the fuel cell power generation facility 45.

Figure 8D:
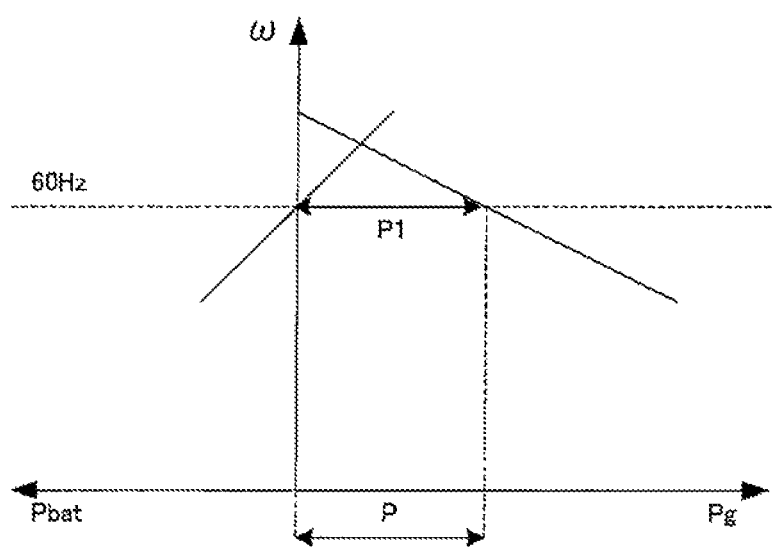
FIG. 8D is a diagram for explaining the dropping characteristic in the case where the fuel cell power generation facility is linked with the system.

The initial state is as shown in FIG. 8D. That is to say, the system load power is P, and the frequency is 60 Hz. Further, the electricity storage facility 111 is in a state that the SOC (State Of Charge) adjustment is completed, and the charging/discharging is not performed. The system load power is shared entirely by the fuel cell power generation facility 121, and the fuel cell power generation facility output P1 is equal to the system load power P.

Figure 8E:
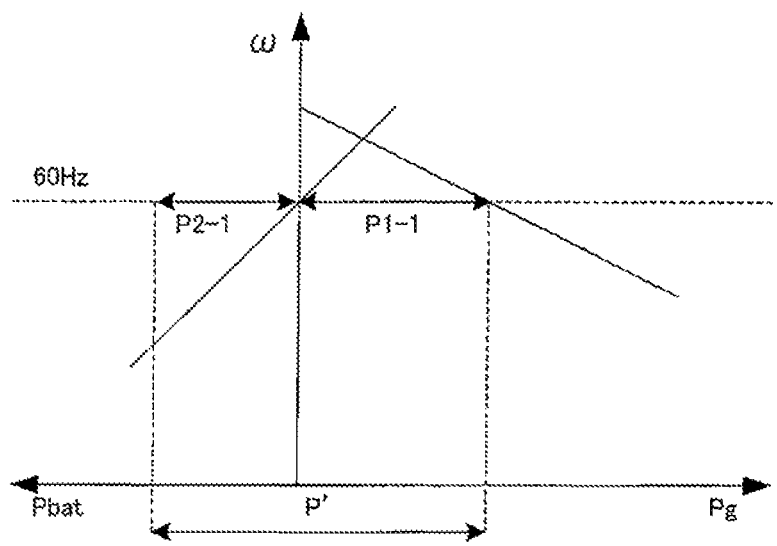
FIG. 8E is a diagram for explaining the dropping characteristic in the case where the fuel cell power generation facility is linked with the system.

When the system load power is increased from P into P', the load is once shared according to the capacity of each power generator, but the frequency command value ωref of the fuel cell power generation facility 121 whose time constant is set to be shorter is first decreased. For this reason, a phase difference between the internal electromotive voltage command value Ef of the fuel cell power generation facility 121 and the internal electromotive voltage command value Ef of the electricity storage facility 111 increases. A voltage phase of the electricity storage facility 111 advances with respect to a voltage phase of the fuel cell power generation facility 121, so that the load sharing of the electricity storage facility 111 increases and the load fluctuation is such that the electricity storage facility 111 bears the load. This state is shown in FIG. 8E.

Figure 8F:
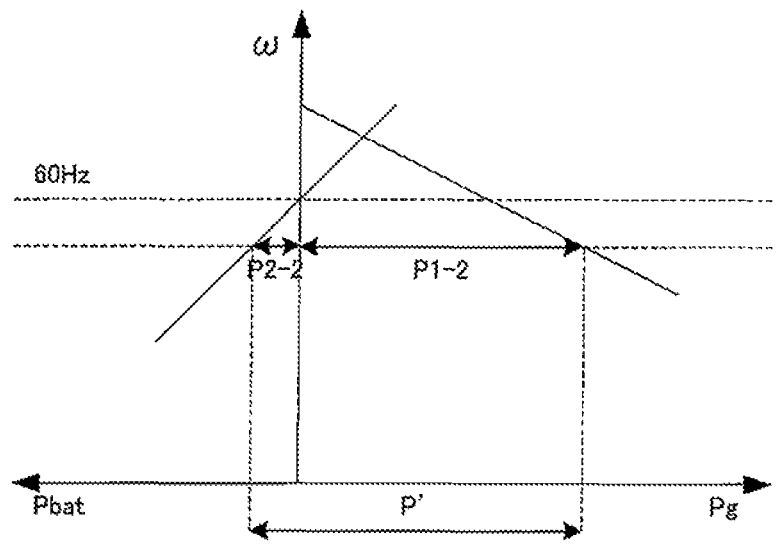
FIG. 8F is a diagram for explaining the dropping characteristic in the case where the fuel cell power generation facility is linked with the system.
Figure 8G:
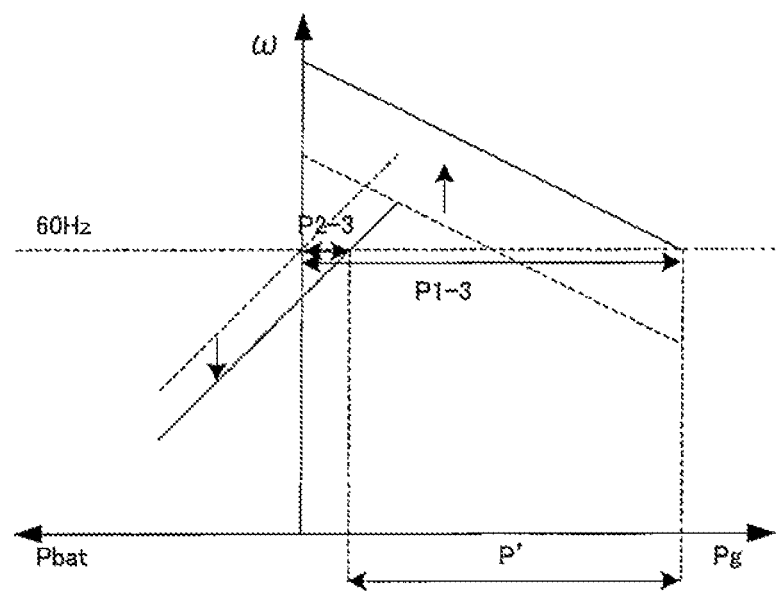
FIG. 8G is a diagram for explaining the dropping characteristic in the case where the fuel cell power generation facility is linked with the system.
Figure 8H:
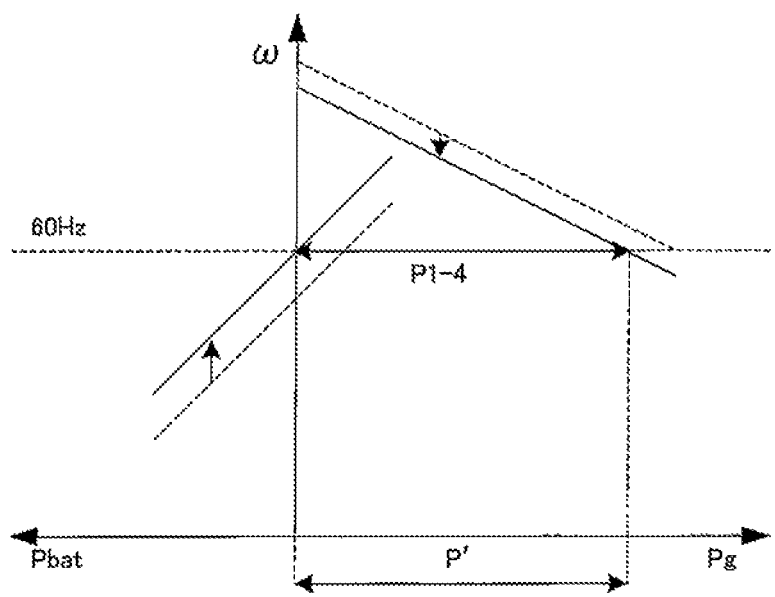
FIG. 8H is a diagram for explaining the dropping characteristic in the case where the fuel cell power generation facility is linked with the system.

Thereafter, the frequency command value ωref of the electricity storage facility 111 decreases so as to be in a state of FIG. 8F. During this, the load sharing of the fuel cell power generation facility 121 gradually increases.

The fuel cell power generation facility 121 increases the active power command value Pref in order to return the frequency to 60 Hz according to the characteristic of FIG. 1D. On the other hand, after the electricity storage facility 111 continues discharging, the SOC reduces, and thus the active power command value Pref is reduced according to the characteristic in FIG. 1B. As a result of these two operations, the electric power system is in a state shown in FIG. 8G That is to say, the frequency is maintained at 60 Hz, the electricity storage facility 111 performs charging of P2-3 in order to return the SOC to a predetermined value, and the fuel cell power generation facility 121 bears the system load power P' and the charging power P2-3 of the electricity storage facility 111 so that the power becomes P1-3.

Further, when the charging of the electricity storage facility 111 proceeds and the SOC is closer to the predetermined value, the output characteristic of the electricity storage facility 111 moves upward, and the charging power reduces. Accordingly, the output characteristic of the fuel cell power generation facility 121 moves downward, and is statically determined in a state of FIG. 8H eventually.

The provision of the power converting apparatus of the present invention produces the following effect.

(1) The self-supported power supply system can be linked with the commercial electric power system for onshore use without switching the control system. Further, in the self-supported power supply system, the fuel cell power generation facility can be linked with the electricity storage facility using the secondary battery. Further, the fuel cell power generation facility and the electricity storage facility can be controlled independently, and modification and addition in the facility constitution become easy.

(2) In the self-supported power supply system, a damage of the fuel cell caused by an abrupt load fluctuation can be prevented.

(3) In the self-supported power supply system, appropriate power supply quality can be secured.

<Testing Result>

Figure 9A:
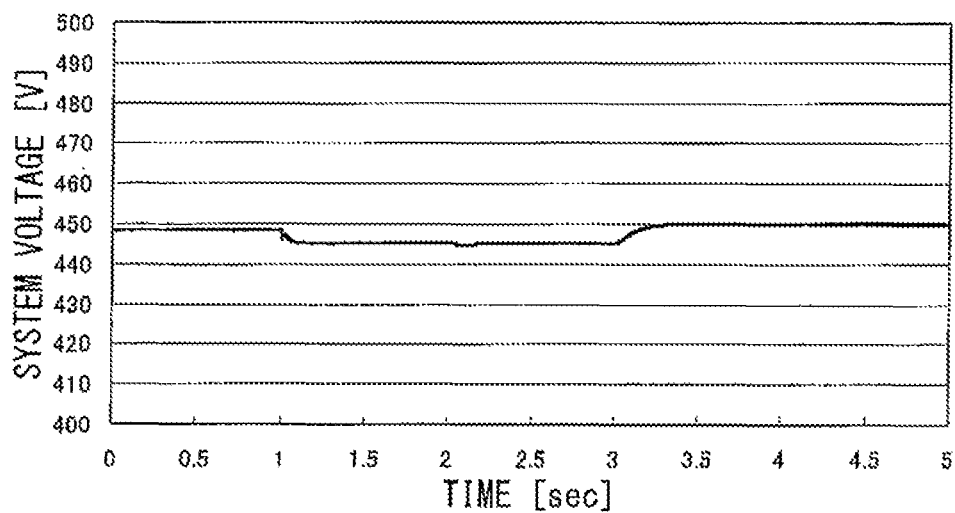
FIG. 9A is a diagram illustrating a simulation testing result of a system voltage in a case where two power converting apparatuses are operated in parallel.
Figure 9B:
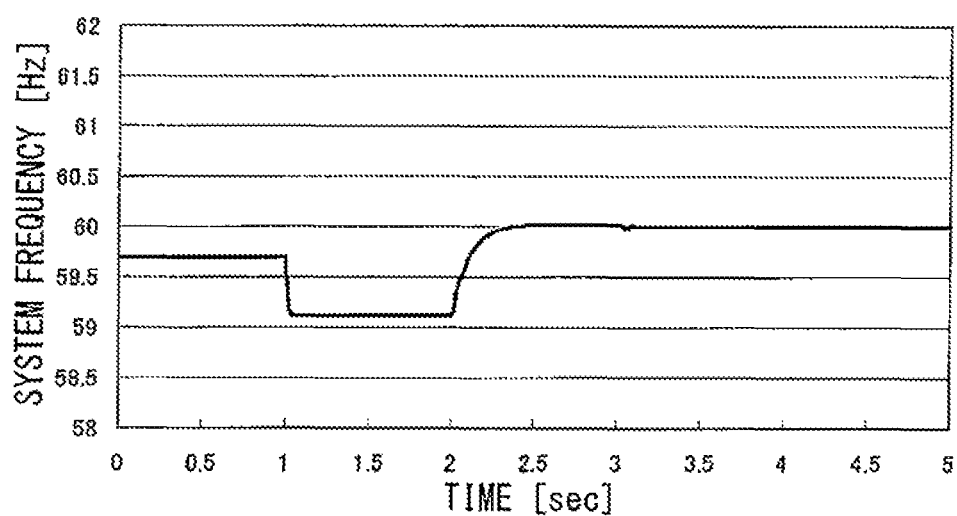
FIG. 9B is a diagram illustrating a simulation testing result of a system frequency in the case where the two power converting apparatuses are operated in parallel.
Figure 9C:
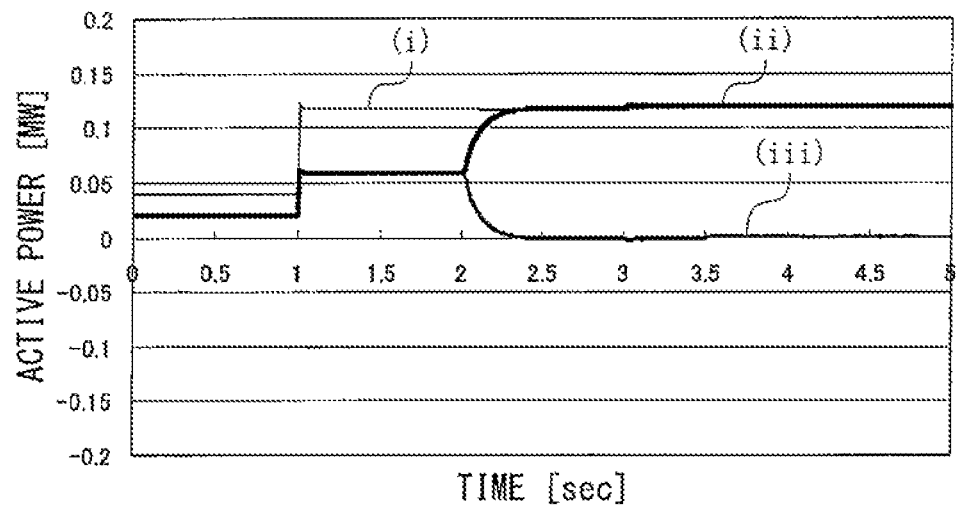
FIG. 9C is a diagram illustrating a simulation testing result of an active power in the case where the two power converting apparatuses are operated in parallel.
Figure 9D:
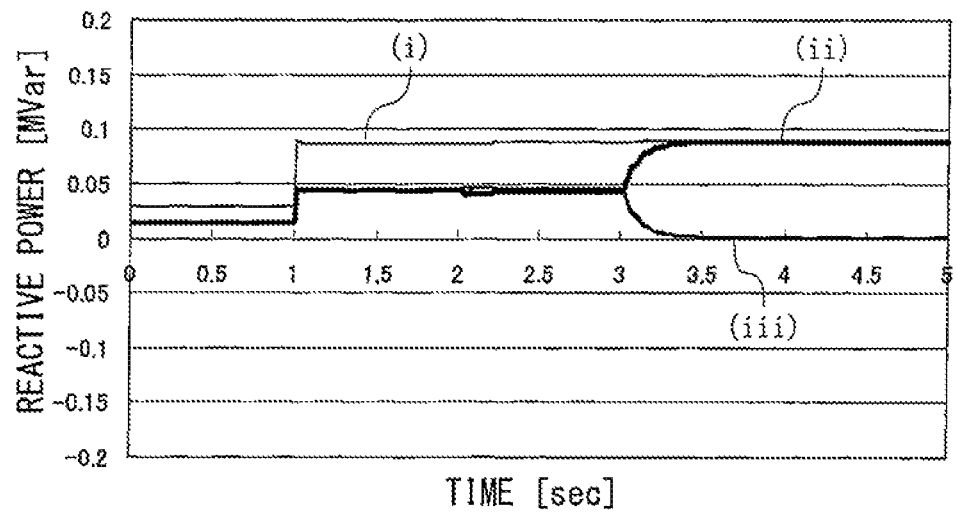
FIG. 9D is a diagram illustrating a simulation testing result of a reactive power in the case where the two power converting apparatuses are operated in parallel.

FIG. 9A, FIG. 9B, FIG. 9C, and FIG. 9D illustrate simulation results when the load fluctuation occurs in a case where the in-vehicle power supply is only the electricity storage facility 111. FIG. 9A is a diagram illustrating a simulation testing result of the system voltage in a case where the two power converting apparatuses for the combined power generation system of the present invention are provided so as to be operated in parallel. FIG. 9B is a diagram illustrating a simulation testing result of the system frequency in the case where the two power converting apparatuses for the combined power generation system of the present invention are provided so as to be operated in parallel. FIG. 9C is a diagram illustrating a simulation testing result of the active power in the case where the two power converting apparatuses for the combined power generation system of the present invention are provided so as to be operated in parallel. FIG. 9D is a diagram illustrating a simulation testing result of the reactive power in the case where the two power converting apparatuses for the combined power generation system of the present invention are provided so as to be operated in parallel. In FIG. 9C, (i) represents a load active power, (ii) represents the active power of one of the two power converting apparatuses, and (iii) represents the active power of the other one of the two power converting apparatuses. Further, in FIG. 9D, (i) represents a load reactive power, (ii) represents the reactive power of one of the two power converting apparatuses, and (iii) represents the reactive power of the other one of the two power converting apparatuses.

The simulation results of FIG. 9A to FIG. 9D show the followings.

The fuel cell power generation facility 121 stops and power converting apparatuses 106a and 106b are operated in parallel. The power command values of both the power converting apparatuses 106 are initially 0 kW and 0 kVar.

Setting of the frequency and a voltage droop are 5% in all the three fuel cell power generation facilities 121 and two power converting apparatuses 106.

The in-vessel load increases from 40 kW and 30 kVar to 120 kW and 90 kVar at a time point of 1 sec.

The active power command value of the power converting apparatus 106a is changed into 120 kW at a time point of 2 sec. Further, the reactive power command value of the power converting apparatus 106a is changed into 90 kVar at a time point of 3 sec.

The output from power converting apparatus 106 is determined not by a command but by the load power. It is found that when the two power converting apparatuses 106a and 106b are operated in parallel and the power command values of the power converting apparatuses 106 are equal to each other, the load is shared evenly by the respective power converting apparatuses 106. Further, when one power command value is changed, the other output automatically changes accordingly. Therefore, when a stationary deviation is observed, and a corresponding power command value is provided, a control can be made so that stationary values of the voltage and the frequency are maintained at a rating value.

Figure 10A:
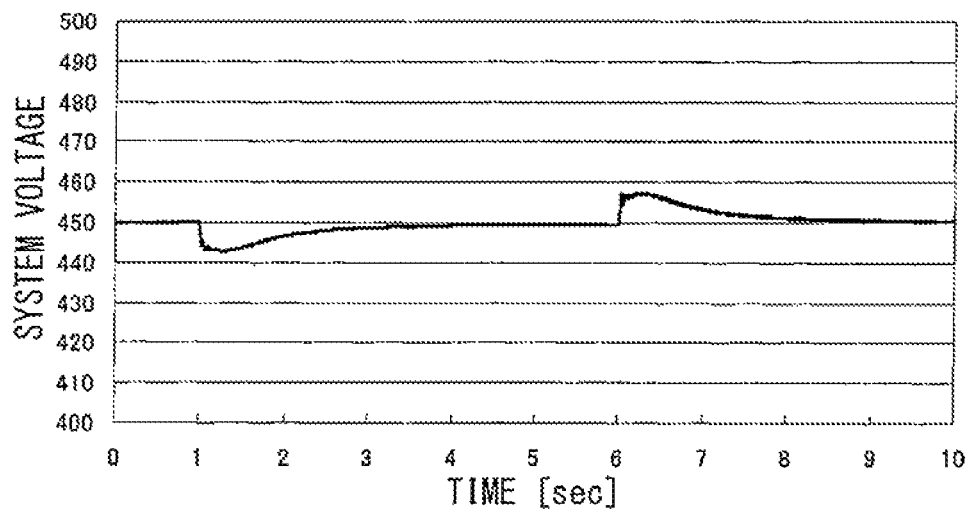
FIG. 10A is a diagram illustrating a simulation testing result of the system voltage in a case where a power converting apparatus and the fuel cell power generation facility are operated in parallel.
Figure 10B:
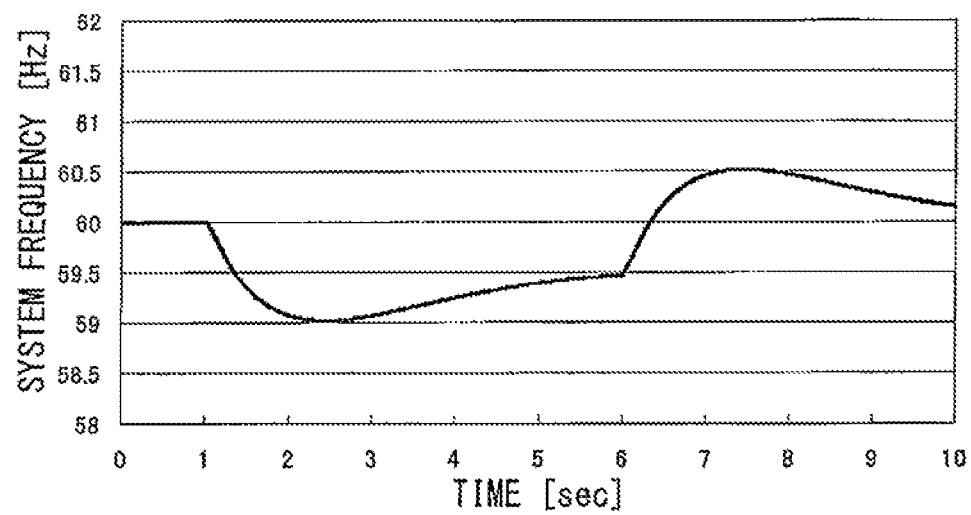
FIG. 10B is a diagram illustrating a simulation testing result of the system frequency in the case where the power converting apparatus and the fuel cell power generation facility are operated in parallel.
Figure 10C:
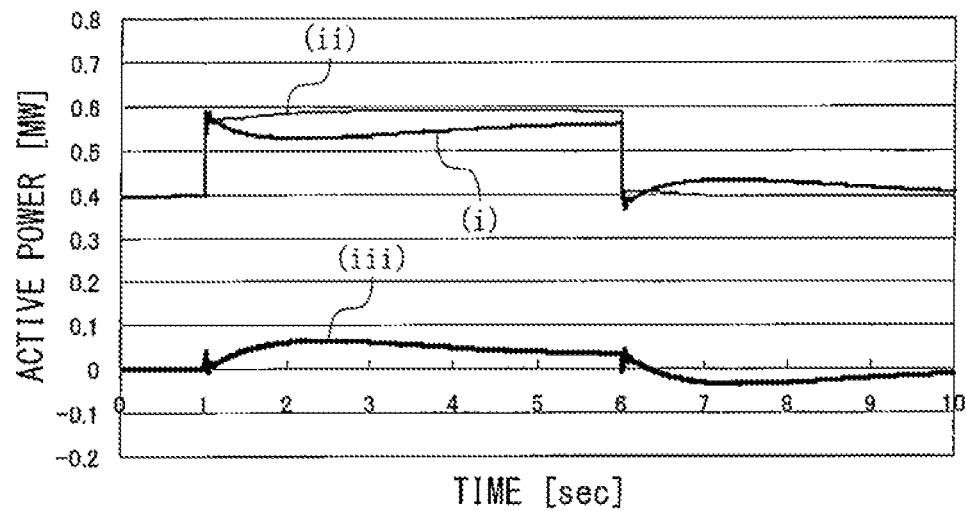
FIG. 10C is a diagram illustrating a simulation testing result of the active power in the case where the power converting apparatus and the fuel cell power generation facility are operated in parallel.
Figure 10D:
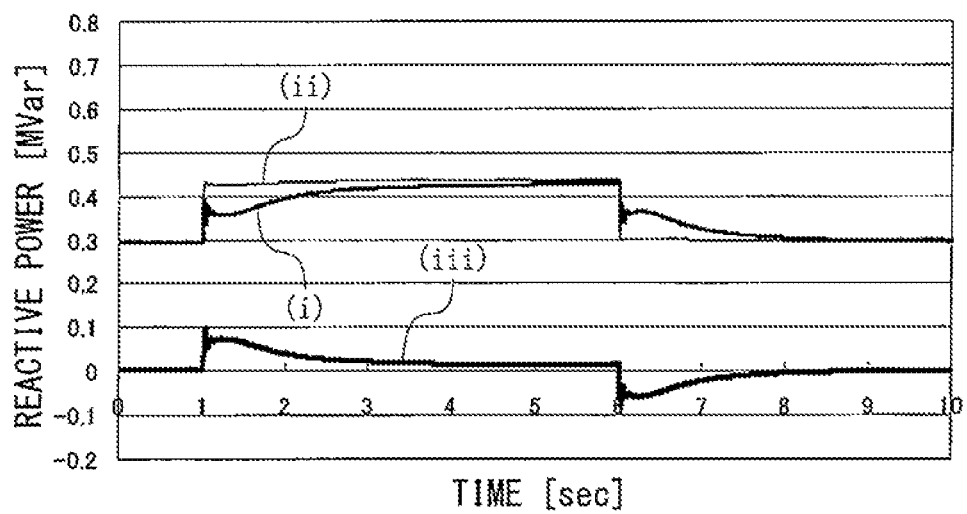
FIG. 10D is a diagram illustrating a simulation testing result of the reactive power in the case where the power converting apparatus and the fuel cell power generation facility are operated in parallel.

When FIG. 10A, FIG. 10B, FIG. 10C, and FIG. 10D illustrate simulation results when the in-vehicle power supplies are the fuel cell power generation facility 121 and the electricity storage facility 111 and the load fluctuation occurs. FIG. 10 A is a diagram illustrating a simulation testing result of the system voltage in a case where the power converting apparatus for the combined power generation system of the present invention and the fuel cell power generation facility are operated in parallel. FIG. 10B is a diagram illustrating a simulation testing result of the system frequency in the case where the power converting apparatus for the combined power generation system of the present invention and the fuel cell power generation facility are operated in parallel. FIG. 10C is a diagram illustrating a simulation testing result of the active power in the case where the power converting apparatus for the combined power generation system of the present invention and the fuel cell power generation facility are operated in parallel. FIG. 10 OD is a diagram illustrating a simulation testing result of the reactive power in the case where the power converting apparatus for the combined power generation system of the present invention and the fuel cell power generation facility are operated in parallel. In FIG. 10C, (i) represents the active power of the fuel cell power generation facility, (ii) represents the load active power, and (iii) represents the active power of the power converting apparatus. Further, in FIG. 10D, (i) represents the reactive power of the fuel cell power generation facility, (ii) represents the load reactive power, and (iii) represents the reactive power of the power converting apparatus.

The simulation results of FIG. 10A to FIG. 10D show the followings.

The fuel cell power generation facility 121 and the power converting apparatus 106a of the one electricity storage facility 111a are operated in parallel. The power command value of the power converting apparatus 106a is initially 0 kW and 0 kVar.

Setting of the frequency and the voltage droop are 5% in all the three fuel cell power generation facilities 121 and two power converting apparatuses 106.

The load increase from 40 kW and 30 kVar into 120 kW and 90 kVar at the time point of 1 sec.

The active power command value of the power converting apparatus 106a is changed into 120 kW at a time point of 2 sec. Further, the reactive power command value of the power converting apparatus 106a is changed into 90 kVar at a time point of 3 sec.

An initial power of the power converting apparatus 106a is approximately 0, but the apparatus 106a bears the load in a constant ratio at the time of the load fluctuation. Similarly to the actual power generator, the load is shared quickly according to the load fluctuations of the active power and the reactive power, so that the fluctuations in the system frequency and the system voltage are reduced. As a result, the power converting apparatus 106 of the present invention has the ability to stabilize the electric power system.

The person skilled in the art understands various modifications and another embodiments of the present invention from the above description. Therefore, the above description should be understood as only an example, and is provided in order to teach the best mode for carrying out the present invention to the person skilled in the art. The detailed structure and/or function can be practically changed without deviating from the spirit of the present invention.

<Another Example of the Power Generation Facility>

Figure 11:
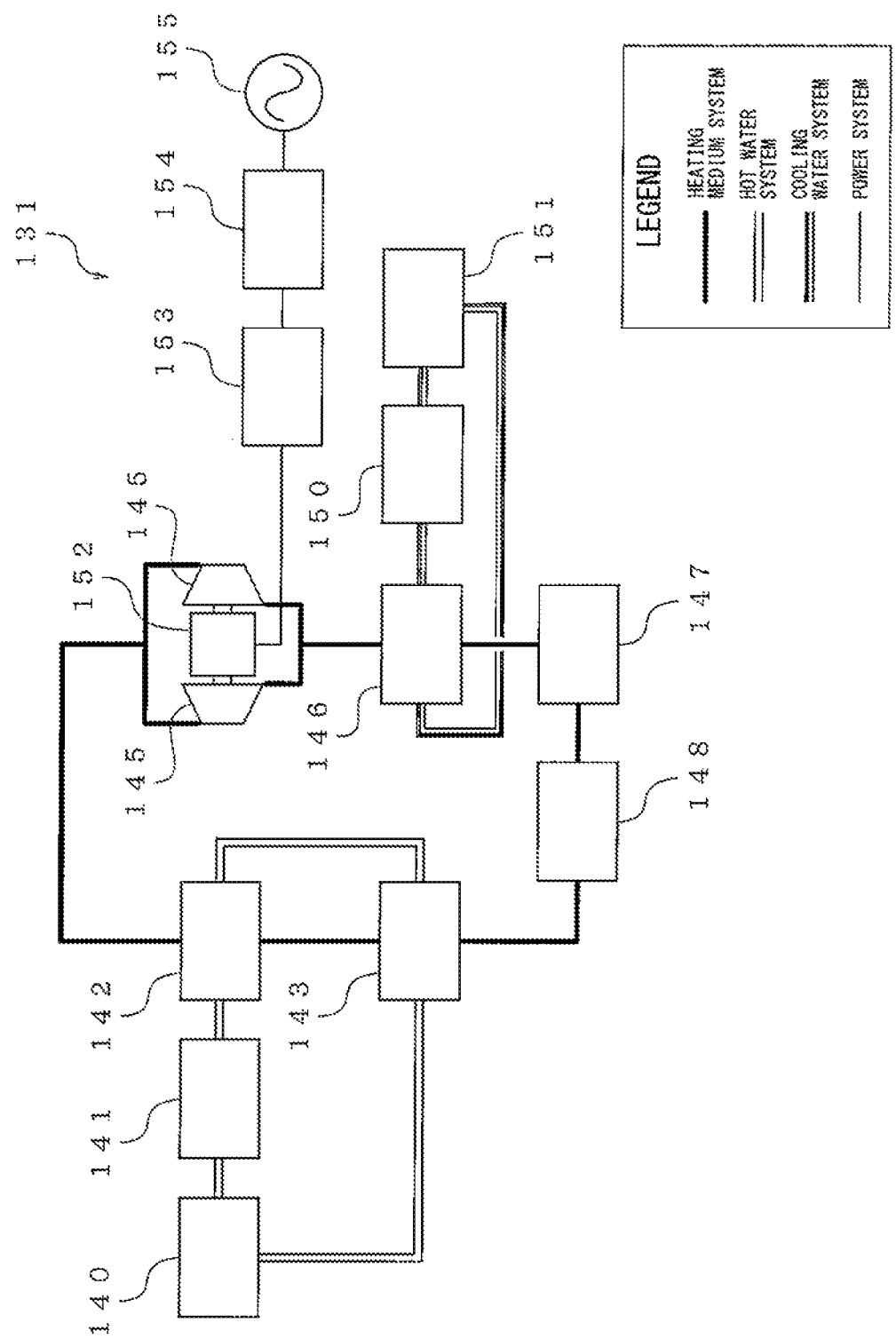
FIG. 11 is a system diagram of a binary power generation facility.

The combined power generation system having the power converting apparatus can be similarly structured also for another type of the power generation facility instead of the fuel cell power generation facility. For example, a binary power generating apparatus shown in FIG. 11 may be applied as the power generation facility.

A binary power generation facility 131 is composed of a turbine 145, a power generator 152, a hot water pump 141, a vaporizer 142, a preheater 143, a condenser 146, a cooling water pump 150, a cooling tower 151, a heating medium pump 148, a tank 147, an AC-DC conversion circuit 153, and a DC-AC conversion circuit 154. Further, a heat source 140 for supplying a heat energy is provided to the binary power generation facility 131, and the generated electric energy is connected to the AC power supply system 155. A terrestrial heat on an isolated island is used as the heat source 140, and a power supply system on an isolated island is used as the AC power supply system 155.

As to a connecting relationship, the heat source 140, the hot water pump 141, the vaporizer 142, and preheater 143 are connected in this order via a piping of a hot water system, and hot water circulates. Further, the tank 147, the heating medium pump 148, the preheater 143, the vaporizer 142, the turbine 145, and the condenser 146 are connected in this order via a piping of a heat medium system, and a heat medium circulates. The cooling tower 151, the cooling water pump 150, and the condenser 146 are connected in this order via a piping of a cooling water system, and cooling water circulates. The power generator 152, the AC-DC conversion circuit 153, the DC-AC conversion circuit 154, and an AC power supply system 155 are connected in this order by a power line.

A function of the binary power generation facility will be described. The heat energy generated from the heat source 140 is supplied to the vaporizer 142 by the hot water pump 141. In the vaporizer 142, the heat energy of the hot water is given to the heat medium by heat exchange, so that the heat medium is vaporized. The hot water circulates also in the preheater 143, and the preheater 143 raises a temperature of the heat medium using a residual heat of the hot water.

The heat medium stored in the tank 147 is supplied to the preheater 143 by using the heating medium pump 148, and receives the heat energy of the hot water there so that the temperature rises. The heat medium, then, circulates in the vaporizer 142, and receives the heat energy of the hot water there so as to be vaporized. The vaporized heat medium is supplied to the turbine 145, and the heat energy of the heat medium is converted into rotation energy of the turbine 145. Thereafter, the heat medium is discharged from the turbine 145, and circulates in the condenser 146 so as to be cooled and liquefied. The liquefied heat medium is stored in the tank 147.

The cooling tower 151 cools the cooling water. The cooling water is supplied to the condenser 146 by using the cooling water pump 150, and is used for liquefying the heat medium in the condenser 146. When the turbine 145 is rotated by the heat medium, the power generator 152 generates an AC power based on the rotating power. The AC power is once converted into a DC power by the AC-DC conversion circuit 153, and is further converted into an AC power supply by the DC-AC conversion circuit 154, and then supplied to the AC power supply system 155.

A steam turbine power generator converts water directly into vapor using a high-temperature heat supply, and rotates a turbine using this vapor. On the contrary, the binary power generating apparatus 131, in which hot water is used as the heat supply, vaporizes the heat medium whose boiling point is lower than water using a heat exchanger, and rotates the turbine 145 using the vaporized heat medium. This is called binary power generation because two kinds of heat media are used. The use of the heat medium whose boiling point is lower than water enables the power generation using the heat supply of low temperature that cannot be used in steam turbine before.

A permanent magnet type high-frequency synchronous machine is used as the power generator 152 in the binary power generating apparatus 131. The power generator 152 is connected to the AC power supply system 155 via the AC-DC conversion circuit 153 and the DC-AC conversion circuit 154. At a time of actuation of the binary power generating apparatus 131, the power generator 152 is used as a starter motor, and is driven by the power conversion circuit. It is operated as the power generator after the actuation. Since the power generator is of a high-frequency type and cannot be connected directly to the system, the AC-DC conversion circuit 153 once converts a power into a DC power, and the DC-AC conversion circuit 154 converts the DC power into an AC power whose voltage, frequency and phase synchronize with the AC power supply system 155 so as to supply the AC power to the AC power supply system. When the DC-AC conversion circuit 154 has the constitution similar to that of the fuel cell power conversion circuit 125, it can be the power converting apparatus for system interconnection including the binary power generating apparatus (namely, the constitution similar to FIG. 1C). At this time, the AC-DC conversion circuit 153 makes voltage constant control for making the voltage on the DC side constant.

INDUSTRIAL APPLICABILITY

The present invention is the combined power generation system having plural types of power supplies, and it can be appropriately used as the power converting apparatus for maintaining the quality of the power supply system in the self-supported power supply system that performs a linkage operation. Further, the present invention can be actively used in a general power supply system.

REFERENCE SIGNS LIST

1 AC POWER SUPPLY SYSTEM
3 CURRENT DETECTOR
4 VOLTAGE DETECTOR
5 SECONDARY BATTERY
6 SECONDARY BATTERY POWER CONVERSION CIRCUIT
7 DC POWER LINE
8 FILTER REACTOR
11 SECONDARY BATTERY SYSTEM CONTROL DEVICE (FIRST SYSTEM CONTROL DEVICE)
13 CURRENT CALCULATOR
14 VOLTAGE/FREQUENCY/PHASE CALCULATOR
15 ACTIVE/REACTIVE POWER CALCULATOR
16 POWER CONVERTING APPARATUS CONTROLLER
17 BATTERY STATE DETECTOR
18 SECONDARY BATTERY MONITORING DEVICE
20 GATE DRIVING SIGNAL (PWM SIGNAL)
21 WIRING
22 WIRING
23 WIRING
30 $\alpha\beta$ CONVERTER
31 PLL CALCULATING CIRCUIT
32 PHASE COMPARATOR
34 LOOP FILTER
35 INTEGRATOR
36 sin CONVERTER
37 cos CONVERTER
40 FREQUENCY COMMAND VALUE CALCULATOR
43 SUBTRACTER
44 PROPORTIONING CONTROLLER
45 FIRST-ORDER LAG CALCULATOR
46 UPPER/LOWER LIMITER
47 ADDER
50 INTERNAL ELECTROMOTIVE VOLTAGE COMMAND VALUE CALCULATOR 53 SUBTRACTER
54 PROPORTIONING CONTROLLER
55 FIRST-ORDER LAG CALCULATOR
56 UPPER/LOWER LIMITER
57 ADDER
58 FUNCTION CALCULATOR
60 INTERNAL PHASE DIFFERENCE ANGLE CALCULATOR
63 SUBTRACTER
64 INTEGRATOR
70 CURRENT COMMAND VALUE CALCULATOR
72 FUNCTION CALCULATOR
83 SUBTRACTER
84 DEAD ZONE CALCULATOR
85 INTEGRATION CONTROLLER
86 ACTIVE POWER COMMAND VALUE CALCULATOR
93 SUBTRACTER
94 PROPORTIONING CONTROLLER
95 UPPER/LOWER LIMIT SETTING DEVICE
96 ACTIVE POWER COMMAND VALUE CALCULATOR
100 IN-VESSEL POWER SUPPLY SYSTEM
102 IN-VESSEL POWER LOAD
103 SOLAR BATTERY UNIT
104 POWER CONVERTER
105 SECONDARY BATTERY
106 SECONDARY BATTERY POWER CONVERTING APPARATUS
107 DIESEL POWER GENERATOR
108 BOW THRUSTER
110 PHOTOVOLTAIC POWER GENERATOR
111 ELECTRICITY STORAGE FACILITY
115 COMMERCIAL ELECTRIC POWER SYSTEM
116 CIRCUIT BREAKER
121 FUEL CELL POWER GENERATION FACILITY
122 FUEL CELL
123 FUEL CELL POWER CONVERTING APPARATUS
124 FUEL CELL SYSTEM CONTROL DEVICE
125 FUEL CELL POWER CONVERSION CIRCUIT
126 VOLTAGE DETECTOR
127 GATE DRIVING SIGNAL
131 BINARY POWER GENERATION FACILITY
140 HEAT SUPPLY
141 HOT WATER PUMP
142 VAPORIZER
143 PREHEATER
145 TURBINE
146 CONDENSER
147 TANK
148 HEAT MEDIUM PUMP
150 COOLING WATER PUMP
151 COOLING TOWER
152 POWER GENERATOR
153 AC-DC CONVERSION CIRCUIT
154 DC-AC CONVERSION CIRCUIT
155 AC ELECTRICITY SYSTEM (ELECTRICITY SYSTEM ON ISLAND)

The invention claimed is:

1. A combined power generation system having a power converting apparatus in a power supply system provided with an electricity storage facility having an electricity storage device and a first power converter connected to the electricity storage device, a power generation facility having a power generating apparatus and a second power converter, connected to the power generating apparatus, for converting an electric power of the power generating apparatus into a predetermined AC power, the combined power generation system including a voltage measuring device for measuring a voltage of the power supply system and a frequency obtaining device for obtaining a frequency of the power supply system, the combined power generation system comprising:

a first measuring device for measuring a value for obtaining an active power and a reactive power at an output terminal of the first power converter;

a first system control device for controlling the first power converter;

a second measuring device for measuring a value for obtaining an active power and a reactive power at an output terminal of the second power converter; and a second system control device for controlling the second power converter, wherein the first system control device includes a first active power command value calculator for proportioning and calculating a deviation between SOC of the electricity storage device and an SOC command value of the electricity storage device so as to calculate a first active power command value, a first frequency command value calculator having
a first proportioning calculator for proportioning and calculating a deviation between the first active power command value and the active power obtained based on the value measured by the first measuring device and
a first adder for adding a reference frequency to an output from the first proportioning calculator so as to calculate a first frequency command value, a first internal phase difference angle calculator for integrating a deviation between the first frequency command value and the frequency obtained by the frequency obtaining device so as to calculate a first internal phase difference angle, a first internal electromotive voltage command value calculator having
a second proportioning calculator for proportioning and calculating a deviation between the first reactive power command value and a reactive power obtained based on the value measured by the first measuring device and
a second adder for adding a reference voltage to an output from the second proportioning calculator so as to calculate a first internal electromotive voltage command value, and a first current command value calculator for calculating a command value of an output current from the first power converter based on the first internal phase difference angle, the first internal electromotive voltage command value, and a voltage measured by the voltage measuring device, the first power converter is controlled based on an output from the first current command value calculator, the second system control device includes
a second active power command value calculator for integrating a deviation between the frequency obtained by the frequency obtaining device and the frequency command value so as to calculate a second active power command value, a second frequency command value calculator having
a third proportioning calculator for proportioning and calculating a deviation between the second active power command value and an active power obtained based on the value measured by the second measuring device and a third adder for adding a reference frequency to an output from the third proportioning calculator so as to calculate a second frequency command value, a second internal phase difference angle calculator for integrating a deviation between the second frequency command value and the frequency obtained by the frequency obtaining device so as to calculate a second internal phase difference angle, a second internal electromotive voltage command value calculator having a fourth proportioning calculator for proportioning and calculating a deviation between a second reactive power command value and a reactive power obtained based on the value measured by the second measuring device and a fourth adder for adding a reference voltage to an output from the fourth proportioning calculator so as to calculate a second internal electromotive voltage command value, and a second current command value calculator for calculating a command value of an output current from the second power converter based on the second internal phase difference angle, the second internal electromotive voltage command value, and the voltage measured by the voltage measuring device, the second power converter is controlled based on an output from the second current command value calculator.

2. The combined power generation system having the power converting apparatus according to claim 1, wherein the first internal electromotive voltage command value calculator is constituted so as to subtract a voltage drop caused by first total impedance that is a sum of internal impedance of the electricity storage facility and outer impedance between the electricity storage facility and the power supply system from the output from the second adder, so as to obtain the first internal electromotive voltage command value, the second internal electromotive voltage command value calculator is constituted so as to subtract a voltage drop caused by second total impedance that is a sum of internal impedance of the fuel cell power generation facility and external impedance between the fuel cell power generation facility and the power supply system from an output from the fourth adder so as to obtain the second internal electromotive voltage command value.

3. The combined power generation system having the power converting apparatus according to claim 2, wherein the first current command value calculator is constituted so as to output a current value for flowing in the first total impedance when the first total impedance is connected between a power supply having a voltage measured by the voltage measuring device and a power supply having the voltage represented by the first internal electromotive voltage command value, the second current command value calculator is constituted so as to output a current value for flowing in the second total impedance when the second total impedance is connected between a power supply having the voltage measured by the voltage measuring device and a power supply having the voltage represented by the second internal electromotive voltage command value.

4. The combined power generation system having the power converting apparatus according to claim 2, wherein the outputs from the first internal electromotive voltage command value calculator, the second internal electromotive voltage command value calculator, the first current command value calculator and the second current command value calculator are calculated by setting the internal impedance of the electricity storage facility to a larger value than an actual value.

5. The combined power generation system having the power converting apparatus according to claim 1, wherein the voltage measuring device and the frequency obtaining device have a voltage detection equipment for measuring a voltage of the power supply system, and a PLL calculator for performing a phase synchronization operation on an output from the voltage detection equipment, and a voltage of the power supply system is calculated based on the output from the voltage detection equipment, and the frequency and the phase of power supply system are calculated based on an output from the PLL calculator.

6. The combined power generation system having the power converting apparatus according to claim 1, wherein the first electric power measuring device is constituted so as to include a voltage detection equipment for measuring a voltage of the power supply system, a PLL calculator for synchronizing and calculating a phase of an output from the voltage detection equipment, and a current detection equipment for measuring an output current from the electricity storage facility, and calculate the active power and the reactive power of the first electric power measuring device based on the output from the current detection equipment and the voltage calculated by the PLL calculator, the second electric power measuring device is constituted so as to include a voltage detection equipment for measuring a voltage of the power supply system, a PLL calculator for synchronizing and calculating a phase of an output from the voltage detection equipment, and a current detection equipment for measuring an output current from the fuel cell power generation facility, and calculate the active power and the reactive power of the second electric power measuring device based on the output from the current detection equipment and the voltage calculated by the PLL calculator.

7. The combined power generation system having the power converting apparatus according to claim 1, comprising:

a first time lag calculator provided between the first proportioning calculator and the first adder, a second time lag calculator provided between the second proportioning calculator and the second adder, a third time lag calculator provided between the third proportioning calculator and the third adder, and a fourth time lag calculator provided between the fourth proportioning calculator and the fourth adder.

8. The combined power generation system having the power converting apparatus according to claim 7, wherein the time lag in the first time lag calculator is larger than the time lag in the third time lag calculator.

9. The combined power generation system having the power converting apparatus according to claim 1, wherein the power generating apparatus is a fuel cell, and the second power converter converts a DC power of the fuel cell into an AC power.

10. The combined power generation system having the power converting apparatus according to claim 1, wherein
the power generating apparatus is a binary power generating apparatus, and
the power generation facility includes the binary power generating apparatus, an AC-DC converter for converting an AC power of the binary power generating apparatus into a DC power, and the second power converter for converting a DC power of the AC-DC converter into an AC power.

11. The combined power generation system having the power converting apparatus according to claim 1, wherein the power supply system is a self-supported power supply system constituted by connecting a motor power generator and a power generator using natural energy.

12. The combined power generation system having the power converting apparatus according to claim 1, wherein the power supply system is a self-supported power supply system constituted by connecting the plurality of electricity storage facilities.

13. The combined power generation system having the power converting apparatus according to claim 1, wherein the power supply system is constituted so that a commercial electric power system is connectable via a circuit breaker.

* * * * *